United States Patent
Chu et al.

(10) Patent No.: US 12,348,345 B2
(45) Date of Patent: Jul. 1, 2025

(54) PADDING AND BACKOFF OPERATIONS WHEN TRANSMITTING VIA MULTIPLE FREQUENCY SEGMENTS IN A WLAN

(71) Applicant: Marvell Asia Pte Ltd, Singapore (SG)

(72) Inventors: Liwen Chu, San Ramon, CA (US); Hongyuan Zhang, Fremont, CA (US); Hui-Ling Lou, Sunnyvale, CA (US); Rui Cao, Sunnyvale, CA (US); Yan Zhang, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/581,026

(22) Filed: Feb. 19, 2024

(65) Prior Publication Data
US 2024/0195666 A1    Jun. 13, 2024

Related U.S. Application Data

(63) Continuation of application No. 18/101,893, filed on Jan. 26, 2023, now Pat. No. 11,909,570, which is a
(Continued)

(51) Int. Cl.
*H04W 72/12* (2023.01)
*H04L 27/26* (2006.01)
(Continued)

(52) U.S. Cl.
CPC ..... *H04L 27/2602* (2013.01); *H04W 72/0453* (2013.01); *H04W 72/12* (2013.01); *H04W 84/12* (2013.01)

(58) Field of Classification Search
CPC .................................................. H04W 74/12
(Continued)

(56) References Cited

U.S. PATENT DOCUMENTS 8,773,969 B1    7/2014  Zhang et al.
8,787,385 B2    7/2014  Liu et al.
(Continued)

FOREIGN PATENT DOCUMENTS

CN    105165088 A    12/2015
CN    109510696 A    3/2019
(Continued)

OTHER PUBLICATIONS

Von Mulert, et al., "Security threats and solutions in MANETs: A case study using AODV and Saodv," J. of Network and Computer Applications, vol. 35, pp. 1249-1259, Feb. 17, 2012.
(Continued)

*Primary Examiner* — Angel T Brockman

(57) ABSTRACT

A communication device performs a first backoff operation with a first backoff counter to determine when to transmit a first packet in a first frequency, and performs a second backoff operation with a second backoff counter to determine when to transmit a second packet in a second frequency segment. In connection with the first backoff counter expiring, the communication device transmits the first packet in the first frequency segment. In connection with the second backoff counter expiring, the communication device transmits the second packet in the second frequency segment simultaneously with transmitting the first packet in the first frequency segment. In response to determining that transmission of the first packet in the first frequency segment failed, the communication device increases a first contention window for a retransmission of the first packet, and does not adjust the second contention window for a next transmission in the second frequency segment.

24 Claims, 12 Drawing Sheets

Related U.S. Application Data continuation of application No. 16/907,099, filed on Jun. 19, 2020, now Pat. No. 11,611,462.

(60) Provisional application No. 62/863,699, filed on Jun. 19, 2019.

(51) Int. Cl.
*H04W 72/0453* (2023.01)
*H04W 84/12* (2009.01)

(58) Field of Classification Search
USPC .................................................... 370/329
See application file for complete search history.

(56) References Cited

U.S. PATENT DOCUMENTS

| | | | |
|---|---|---|---|
| 9,516,634 B2 | 12/2016 | Sampath et al. | |
| 9,876,614 B1 | 1/2018 | Sun et al. | |
| 10,257,806 B2 | 4/2019 | Chu et al. | |
| 10,349,413 B2 | 7/2019 | Zhang et al. | |
| 10,939,476 B1 | 3/2021 | Chu et al. | |
| 11,588,603 B2 | 2/2023 | Chu et al. | |
| 11,611,462 B2 | 3/2023 | Chu et al. | |
| 11,909,570 B2 | 2/2024 | Chu et al. | |
| 2004/0240426 A1 | 12/2004 | Wu et al. | |
| 2004/0264561 A1 | 12/2004 | Alexander et al. | |
| 2007/0047461 A1 | 3/2007 | Seo et al. | |
| 2010/0208712 A1 | 8/2010 | Wax et al. | |
| 2011/0096747 A1 | 4/2011 | Seok | |
| 2011/0249659 A1 | 10/2011 | Fontaine et al. | |
| 2012/0014336 A1 | 1/2012 | Seok | |
| 2015/0098541 A1 | 4/2015 | Ben-bassat | |
| 2015/0146653 A1 | 5/2015 | Zhang et al. | |
| 2015/0264689 A1 | 9/2015 | Sampath et al. | |
| 2015/0271002 A1 | 9/2015 | Oh et al. | |
| 2016/0057657 A1 | 2/2016 | Seok | |
| 2016/0157261 A1 | 6/2016 | Xiang | |
| 2016/0212748 A1 | 7/2016 | Yang et al. | |
| 2016/0241315 A1 | 8/2016 | Kwon | |
| 2016/0249381 A1 | 8/2016 | Choi et al. | |
| 2016/0302200 A1 | 10/2016 | Yang et al. | |
| 2016/0323820 A1 | 11/2016 | Wong et al. | |
| 2017/0048048 A1 | 2/2017 | Seok | |
| 2017/0111853 A1 | 4/2017 | Hegde et al. | |
| 2017/0149547 A1 | 5/2017 | Kim et al. | |
| 2017/0181136 A1 | 6/2017 | Bharadwaj et al. | |
| 2017/0188336 A1 | 6/2017 | Ahn et al. | |
| 2017/0289933 A1 | 10/2017 | Segev et al. | |
| 2017/0295571 A1 | 10/2017 | Chu et al. | |
| 2017/0311204 A1 | 10/2017 | Cariou et al. | |
| 2017/0311260 A1 | 10/2017 | Trainin et al. | |
| 2017/0325178 A1 | 11/2017 | Verma et al. | |
| 2017/0366329 A1 | 12/2017 | Cao et al. | |
| 2018/0115403 A1 | 4/2018 | Sakai et al. | |
| 2018/0160429 A1 | 6/2018 | Seok | |
| 2018/0205441 A1 | 7/2018 | Asterjadhi et al. | |
| 2018/0288799 A1 | 10/2018 | Min et al. | |
| 2018/0302858 A1 | 10/2018 | Son et al. | |
| 2019/0090278 A1 | 3/2019 | Chu et al. | |
| 2019/0123863 A1 | 4/2019 | Zhang et al. | |
| 2019/0124652 A1 | 4/2019 | Kim et al. | |
| 2019/0182714 A1 | 6/2019 | Chu et al. | |
| 2019/0182863 A1 | 6/2019 | Chu et al. | |
| 2019/0190752 A1 | 6/2019 | Chen et al. | |
| 2019/0238259 A1 | 8/2019 | Huang et al. | |
| 2019/0349930 A1 | 11/2019 | Chu et al. | |
| 2020/0037324 A1 | 1/2020 | Chu et al. | |
| 2020/0107393 A1 | 4/2020 | Chu et al. | |

FOREIGN PATENT DOCUMENTS

| | | |
|---|---|---|
| EP | 2028809 A2 | 2/2009 |
| EP | 2999252 A1 | 3/2016 |
| GB | 2501898 A | 11/2013 |
| WO | 2006000955 A1 | 1/2006 |
| WO | 2012026779 A2 | 3/2012 |
| WO | 2015066175 A1 | 5/2015 |
| WO | 2015099803 A1 | 7/2015 |
| WO | 2017026937 A1 | 2/2017 |
| WO | 2017111567 A2 | 6/2017 |

OTHER PUBLICATIONS

International Search Report and Written Opinion in International Patent Application No. PCT/US2020/038820, mailed Sep. 8, 2020 (12 pages).

Seok et al., "Enhanced Multi-band/Multi-channel Operation," IEEE draft doc. IEEE 802.11—19/076641, vol. 802.11 EHT; 802.11be, No. 1; 13 pages (May 14, 2019).

Seok et al., "EHT Multi-link Operation," IEEE draft doc. IEEE 802.11-19/0731r0, vol. G. 802.11 EHT; 802.11be; 17 pages (May 15, 2019).

Choi et al., "View on EHT Objectives and Technologies," IEEE draft doc. IEEE 802.11-18/1171r0, 13 pages (Jul. 8, 2018).

Chu et al., "Multiple Band Operation Discussion," IEEE draft doc. IEEE 802.11-19/0821r0, vol. 802.11 EHT; 802.11be; 7 pages (May 14, 2019).

Fischer et al., "IEEE P802.11—Wireless LANs—Disallowed Sub channels," doc. No. IEEE 802.11-18/0496r3, The Institute of Electrical and Electronics Engineers, pp. 1-11 (May 2018).

IEEE P802.11 ax ™M/D4.0, "Draft Standard for Information technology - Telecommunications and information exchange between systems Local and metroplitan area networks—Specification Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11 ax ™M/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency Wlan," IEEE Computer Society, 772 pages (Oct. 2019).

IEEE Std 802.11-REVmc™M/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

Zhang et al., "EHT Technology Candidate Discussions," IEEE draft doc IEEE 802.11-18/1161r0, 10 pages (Jul. 8, 2018).

U.S. Appl. No. 16/406,898, Chu et al., "Wifi Backoff Timer," filed on May 8, 2019.

U.S. Appl. No. 16/847,326, Chu et al., "Allocating Resource Units for Uplink Multi-User Transmissions in Wide Bandwidths," filed Apr. 13, 2020.

Notice of Reasons for Refusal for Japanese Patent Application No. 2021-573928, mailed Feb. 2, 2024 (6 pages).

First Office Action for Chinese Application No. 202080058423.2, mailed Feb. 21, 2025 . (8 pages).

Search Report for Chinese Application No. 202080058423.2, mailed Feb. 21, 2025 . (2 pages).

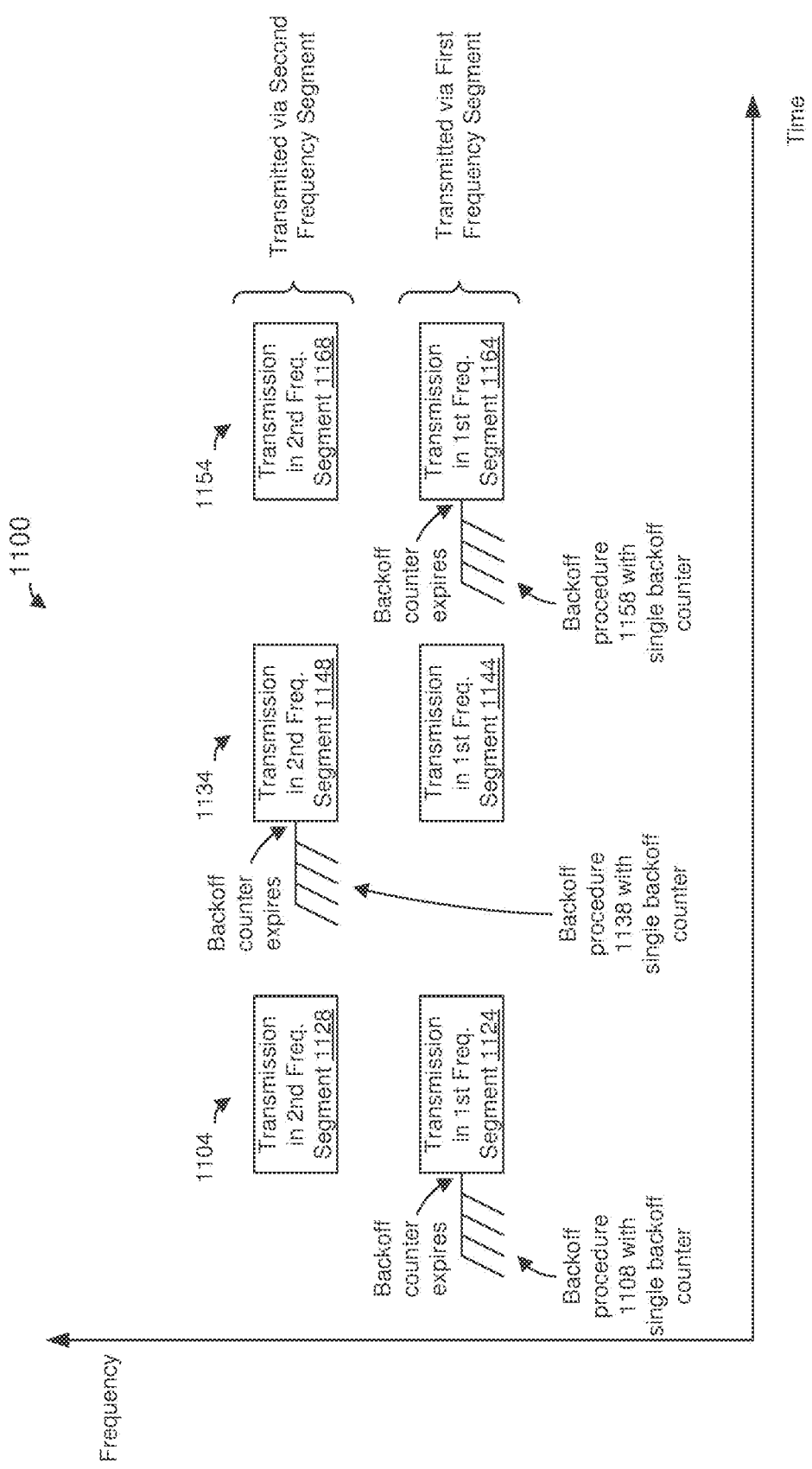

PADDING AND BACKOFF OPERATIONS WHEN TRANSMITTING VIA MULTIPLE FREQUENCY SEGMENTS IN A WLAN

CROSS REFERENCES TO RELATED APPLICATIONS

The present application is a continuation application of U.S. patent application Ser. No. 18/101,893, entitled "PADDING AND BACKOFF OPERATIONS WHEN TRANSMITTING VIA MULTIPLE FREQUENCY SEGMENTS IN A WLAN," filed on Jan. 26, 2023, (now U.S. Pat. No. 11,909,570), which is a continuation of U.S. application Ser. No. 16/907,099, filed on Jun. 19, 2020, entitled "PADDING AND BACKOFF OPERATIONS WHEN TRANSMITTING VIA MULTIPLE FREQUENCY SEGMENTS IN A WLAN", (now U.S. Pat. No. 11,611,462), which claims the benefit of U.S. Provisional Patent Application No. 62/863,699, entitled "MULTI-BAND OPERATION: SYNCHRONIZED AND UNSYNCHRONIZED," filed on Jun. 19, 2019. All of the applications referenced above are incorporated herein by reference in their entireties.

FIELD OF TECHNOLOGY

The present disclosure relates generally to wireless communication systems, and more particularly to simultaneous transmission and/or reception in multiple frequency segments in a wireless local area network (WLAN).

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHZ aggregate communication channels (or perhaps even wider aggregate communication channels). Additionally, the IEEE 802.11be Standard may permit aggregation of 20 MHZ sub-channels in different frequency segments (for example, separated by a gap in frequency) to form respective communication links. Further, the IEEE 802.11be Standard may permit aggregation 20 MHz sub-channels in different radio frequency (RF) bands to form a single aggregate channel, or may permit aggregation of 20 MHz sub-channels in the different RF bands to form respective communication links.

The current IEEE 802.11 Standard (referred to herein as "the IEEE 802.11 Standard" for simplicity) provides for a first communication device to transmit packets to a second communication device via a single communication channel. The IEEE 802.11 Standard also provides mechanisms for a device to determine whether the single communication channel is busy or idle for purposes of determine whether the device can transmit in the single communication channel.

SUMMARY

In an embodiment, a method for communicating in a wireless local area network (WLAN) includes: determining, at a communication device, that the communication device is to transmit in a first frequency segment simultaneously with transmitting in a second frequency segment; performing, at the communication device, a first backoff operation with a first backoff counter to determine when to transmit a first packet in the first frequency segment, the first backoff counter measuring a first contention window; performing, at the communication device, a second backoff operation with a second backoff counter to determine when to transmit a second packet in the second frequency segment, the second backoff counter measuring a second contention window; in connection with the first backoff counter expiring, transmitting, by the communication device, the first packet in the first frequency segment; in connection with the second backoff counter expiring, transmitting, by the communication device, the second packet in the second frequency segment simultaneously with transmitting the first packet in the first frequency segment; and in response to determining, at the communication device, that transmission of the first packet in the first frequency segment failed: increasing, by the communication device, the first contention window for a retransmission of the first packet in the first frequency segment, and not adjusting, by the communication device, the second contention window for a next transmission in the second frequency segment.

In another embodiment, a communication device comprises: a wireless network interface device that is configured to communicate via multiple frequency segments, the wireless network interface device including one or more integrated circuit (IC) devices and a plurality backoff counters implemented on the one or more IC devices. The one or more IC devices are configured to: determine that the communication device is to transmit in a first frequency segment simultaneously with transmitting in a second frequency segment; perform a first backoff operation with a first backoff counter among the plurality of backoff counters to determine when to transmit a first packet in the first frequency segment, the first backoff counter measuring a first contention window; perform a second backoff operation with a second backoff counter among the plurality of backoff counters to determine when to transmit a second packet in the second frequency segment, the second backoff counter measuring a second contention window; in connection with the first backoff counter expiring, control the wireless network interface device to transmit the first packet in the first frequency segment; in connection with the second backoff counter expiring, control the wireless network interface device to transmit the second packet in the second frequency segment simultaneously with transmitting the first packet in the first frequency segment; and in response to determining that transmission of the first packet in the first frequency segment failed: increase the first contention window for a retransmission of the first packet in the first frequency segment, and not adjust the second contention window for a next transmission in the second frequency segment.

BRIEF DESCRIPTION OF THE DRAWINGS

FIG. 11 is a diagram of an example of synchronized and simultaneous transmissions in multiple frequency segments, according to another embodiment.

DETAILED DESCRIPTION

A next generation wireless local area network (WLAN) protocol (e.g., the IEEE 802.11be Standard, sometimes referred to as the Extremely High Throughput (EHT) WLAN Standard) may permit aggregation of as many as sixteen (or perhaps even more) 20 MHz sub-channels to form 320 MHz aggregate communication channels (or perhaps even wider aggregate communication channels). Additionally, the IEEE 802.11be Standard may permit aggregation of 20 MHz sub-channels in different frequency segments (for example, separated by a gap in frequency) to form respective communication links. Additionally, the IEEE 802.11be Standard may permit the formation of multiple WLAN communication links corresponding to respective frequency segments. The multiple WLAN communication links may be used to simultaneously transmit/receive different information.

In some embodiments described below, multiple packets are simultaneously transmitted in respective frequency segments beginning at different times. Padding is included in one or more of the packets so that transmission of the multiple packets end at a same time.

In some embodiments described below, respective backoff operations are performed in connection with respective frequency segments to determine when simultaneous transmissions in multiple frequency segments can begin. In other embodiments described below, a single backoff operation is performed in connection with only one frequency segment to determine when simultaneous transmissions in multiple frequency segments can begin.

Figure 1:
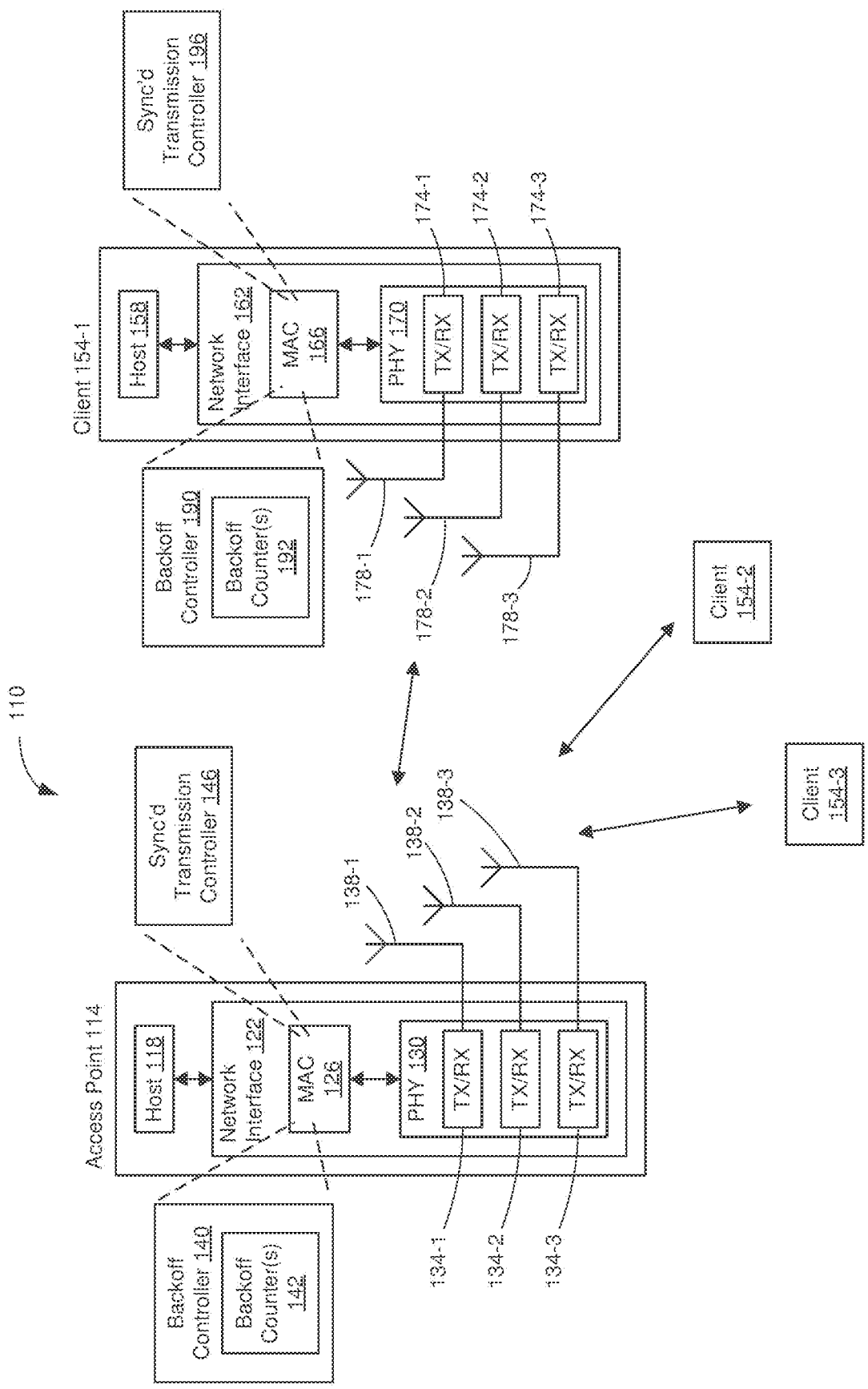
FIG. 1 is a block diagram of an example communication system in which communication devices wirelessly exchange information via multiple frequency segments, according to an embodiment.

FIG. 1 is a diagram of an example WLAN 110 that uses multiple communication links in multiple frequency segments or in different radio frequency (RF) bands, according to an embodiment. The WLAN 110 includes an access point (AP) 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to simultaneously communicate via multiple communication links in respective frequency segments within a single RF band, and/or to communicate via the multiple communication links at different times. In another embodiment, the wireless network interface device 122 is additionally configured for operation within two or more RF bands at the same time or at different times. For instance, in an embodiment, the wireless network interface device 122 is configured to simultaneously communicate via multiple communication links in respective RF bands, and/or to communicate via the multiple communication links at different times. In an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. Additionally, the MAC processor 126 is configured to select communication links via which MAC layer data units should be transmitted and to control the PHY processor 130 so that the MAC layer data units are transmitted in the selected communication links, in some embodiments. Also, the MAC processor 126 is configured to determine when the respective communication links are idle and available for transmission and to control the PHY processor 130 so that MAC layer data units are transmitted when respective communication links are idle, in some embodiments. Additionally, the MAC processor 126 is configured to determine when client stations are in a sleep state and therefore unavailable to transmit or receive, in some embodiments. For example, the MAC processor 126 is configured to negotiate a schedule with a client station for when the client station is permitted to be in the sleep state and when the client station should be in a wake state and available to transmit to or receive from the AP 114, according to some embodiments.

The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a ROM, a flash memory, etc. In other embodiments, the MAC processor 126 additionally or alternatively includes one or more hardware state machines.

The MAC processor 126 includes, or implements, a backoff controller 140 that is configured to implement a backoff procedure in connection with determining when a transmission in a communication channel can proceed, according to some embodiments. The backoff controller 140 includes one or more backoff counters (sometimes referred to as timers) 142. When the network interface device 122 is to transmit and when the network interface device 122 determines that a transmission of a data unit failed and is to be retransmitted, the backoff controller 140 invokes the backoff procedure. The backoff procedure generally involves setting a backoff counter 142 and decrementing the backoff counter 142 to determine when the network interface device 122 can transmit a frame.

The backoff counter 142 is set to a value chosen randomly or pseudo-randomly so that backoff counters of different communication devices in the network tend to reach zero at different times, according to some embodiments. While the backoff controller 140 determines that a channel medium is idle, the backoff controller 140 controls the backoff counter 142 to decrement. On the other hand, when the backoff controller 140 determines that the communication medium is busy, the backoff controller 140 pauses the backoff counter 142 and does not resume decrementing the backoff counter 142 until the communication medium is subsequently determined to be idle. Generally, when the backoff counter 142 reaches zero, the backoff controller 140 determines that the communication device is free to transmit. In some embodiments, prior to transmission, the network interface device 122 also determines whether the sub-channel(s) in which the transmission is to occur are idle for a determined time period immediately prior to a start of the transmission. In some embodiments, when the backoff counter 142 reaches zero but the sub-channel(s) in which the transmission is to occur are not idle for the determined time period immediately prior to a start of the transmission, no transmission is made and the backoff counter is reset.

In an embodiment, determining whether the channel medium is idle includes measuring an energy level in the channel medium and comparing the measured energy level to a threshold. When the measured energy level is less than the threshold, the channel medium is determined to be idle; whereas when the measured energy level meets the threshold (e.g., is greater than the threshold, is greater than or equal to the threshold, etc.), the channel medium is determined to be busy, according to an embodiment. In some embodiments, the PHY processor 130 includes one or more energy sensors (not shown) that measure energy levels in one or more frequency segments of a communication channel, and the measured energy levels are used to determine if the channel medium is idle.

In an embodiment, setting the backoff counter 142 includes randomly or pseudorandomly choosing an initial value for the backoff counter 142 from a range of initial values. In an embodiment, the range of initial values is [0, CW], where CW is a contention window parameter, where the initial value and CW are in units of a slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of CWmax. The parameters CWmin and CWmax are also in units of slots. In an embodiment, the backoff counter 142 is decremented in units of slots.

In some embodiments, when a communication channel comprises multiple frequency segments, multiple respective backoff counters 142 are maintained for the multiple frequency segments, at least in some scenarios. In some embodiments, when a communication channel comprises multiple frequency segments, a single backoff counter 142 is maintained for one of the multiple frequency segments, at least in some scenarios.

In various embodiments, the backoff controller 140 performs various acts related to the one or more backoff counters 142, as will be described in more detail below, such as one or more of (or none of) i) determining whether to employ multiple backoff counters 142 corresponding to respective frequency segments when simultaneously transmitting via multiple frequency segments; ii) when a single backoff counter 142 is to be utilized when simultaneously transmitting via multiple frequency segments, selecting one frequency segment to which the single backoff counter 142 corresponds; etc.

In an embodiment, the backoff controller 140 is implemented by a processor executing machine readable instructions stored in a memory, where the machine readable instructions cause the processor to perform acts described in more detail below. In another embodiment, the backoff controller 140 additionally or alternatively comprises hardware circuitry (e.g., one or more counters, one or more timers, one or more hardware state machines, etc.) that is configured to perform acts described in more detail below. In some embodiments in which the hardware circuitry comprises one or more hardware state machines, the one or more hardware state machines are configured to perform acts described in more detail below.

Additionally or alternatively, the MAC processor 126 includes, or implements, a synchronized transmission controller 146 that is configured to determine when multiple transmissions in multiple respective frequency segments are to be synchronized (e.g., the multiple transmissions begin at a same time, and optionally end at a same time), according to an embodiment. In some embodiments in which multiple backoff counters 142 corresponding to respective frequency segments are employed when simultaneously transmitting via multiple frequency segments, the synchronized transmission controller 146 defers transmission in all of the multiple frequency segments until all of the multiple backoff counters 142 have expired (e.g., reached zero). In some embodiments, when a simultaneous transmission via multiple frequency segments is unsynchronized (e.g., the respective transmissions in respective frequency segments begin at different times), the synchronized transmission controller 146 is configured to control the PHY processor 130 so that the respective transmissions in respective frequency segments end at a same time.

In an embodiment, the synchronized transmission controller 146 is implemented by a processor executing machine readable instructions stored in a memory, where the machine readable instructions cause the processor to perform acts described in more detail below. In another embodiment, the synchronized transmission controller 146 additionally or alternatively comprises hardware circuitry that is configured to perform acts described in more detail below. In some embodiments, the hardware circuitry comprises one or more hardware state machines that are configured to perform acts described in more detail below.

In other embodiments, the backoff controller 140 and/or the synchronized transmission controller 146 are omitted from the AP 114.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. Additionally, the MAC processor 166 is configured to select communication links via which MAC layer data units should be transmitted and to control the PHY processor 170 so that the MAC layer data units are transmitted in the selected communication links, in some embodiments. Also, the MAC processor 166 is configured to determine when the respective communication links are idle and available for transmission and to control the PHY processor 170 so that MAC layer data units are transmitted when respective communication links are idle, in some embodiments. Additionally, the MAC processor 166 is configured to control when portions of the wireless network interface device 162 are in a sleep state or a wake state, for example to conserve power, in some embodiments. For example, the MAC processor 166 is configured to negotiate a schedule with the AP 114 for when the client station 154-1 is permitted to be in the sleep state and when the client station 154-1 should be in a wake state and available to transmit to or receive from the AP 114, according to some embodiments.

The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or implements, a backoff controller 190 that is the same or similar to the backoff controller 140, according to some embodiments. The backoff controller 190 includes one or more backoff counters (sometimes referred to as timers) 192. While the backoff controller 190 determines that a channel medium is idle, the backoff controller 190 controls the backoff counter 192 to decrement. On the other hand, when the backoff controller 190 determines that the communication medium is busy, the backoff controller 190 pauses the backoff counter 192 and does not resume decrementing the backoff counter 192 until the communication medium is subsequently determined to be idle. Generally, if the communication medium is still idle when the backoff counter 192 reaches zero, the backoff controller 190 determines that the communication device is free to transmit. On the other hand, if the communication medium is busy when the backoff counter 192 reaches zero, the backoff controller 190 resets the backoff counter 192 and the process repeats.

In some embodiments, when a communication channel comprises multiple frequency segments, multiple respective backoff counters 192 are maintained for the multiple frequency segments, at least in some scenarios. In some embodiments, when a communication channel comprises multiple frequency segments, a single backoff counter 192 is maintained for one of the multiple frequency segments, at least in some scenarios.

In various embodiments, the backoff controller 190 performs various acts related to the operation of one or more backoff counters 192, as will be described in more detail below, such as one or more of (or none of) i) determining whether to employ multiple backoff counters 192 corresponding to respective frequency segments when simultaneously transmitting via multiple frequency segments; ii) when a single backoff counter 192 is to be utilized when simultaneously transmitting via multiple frequency segments, selecting one frequency segment to which the single backoff counter 192 corresponds; etc.

In an embodiment, the backoff controller 190 is implemented by a processor executing machine readable instructions stored in a memory, where the machine readable instructions cause the processor to perform acts described in more detail below. In another embodiment, the backoff controller 190 additionally or alternatively comprises hardware circuitry (e.g., one or more counters, one or more timers, one or more hardware state machines, etc.) that is configured to perform acts described in more detail below. In some embodiments in which the hardware circuitry comprises one or more hardware state machines, the one or more hardware state machines are configured to perform acts described in more detail below.

Additionally or alternatively, the MAC processor 166 includes, or implements, a synchronized transmission controller 196 the same as or similar to the synchronized transmission controller 146, according to some embodiments. The synchronized transmission controller 196 is configured to determine when multiple transmissions in multiple respective frequency segments are to be synchronized (e.g., the multiple transmissions begin at a same time, and optionally end at a same time), according to an embodiment. In some embodiments in which multiple backoff counters 192 corresponding to respective frequency segments are employed when simultaneously transmitting via multiple frequency segments, the synchronized transmission controller 196 defers transmission in all of the multiple frequency segments until all of the multiple backoff counters 192 have expired (e.g., reached zero). In some embodiments, when a simultaneous transmission via multiple frequency segments is unsynchronized (e.g., the respective transmissions in respective frequency segments begin at different times), the synchronized transmission controller 196 is configured to control the PHY processor 170 so that the respective transmissions in respective frequency segments end at a same time.

In an embodiment, the synchronized transmission controller 196 is implemented by a processor executing machine readable instructions stored in a memory, where the machine readable instructions cause the processor to perform acts described in more detail below. In another embodiment, the synchronized transmission controller 196 additionally or alternatively comprises hardware circuitry that is configured to perform acts described in more detail below. In some embodiments, the hardware circuitry comprises one or more hardware state machines that are configured to perform acts described in more detail below.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
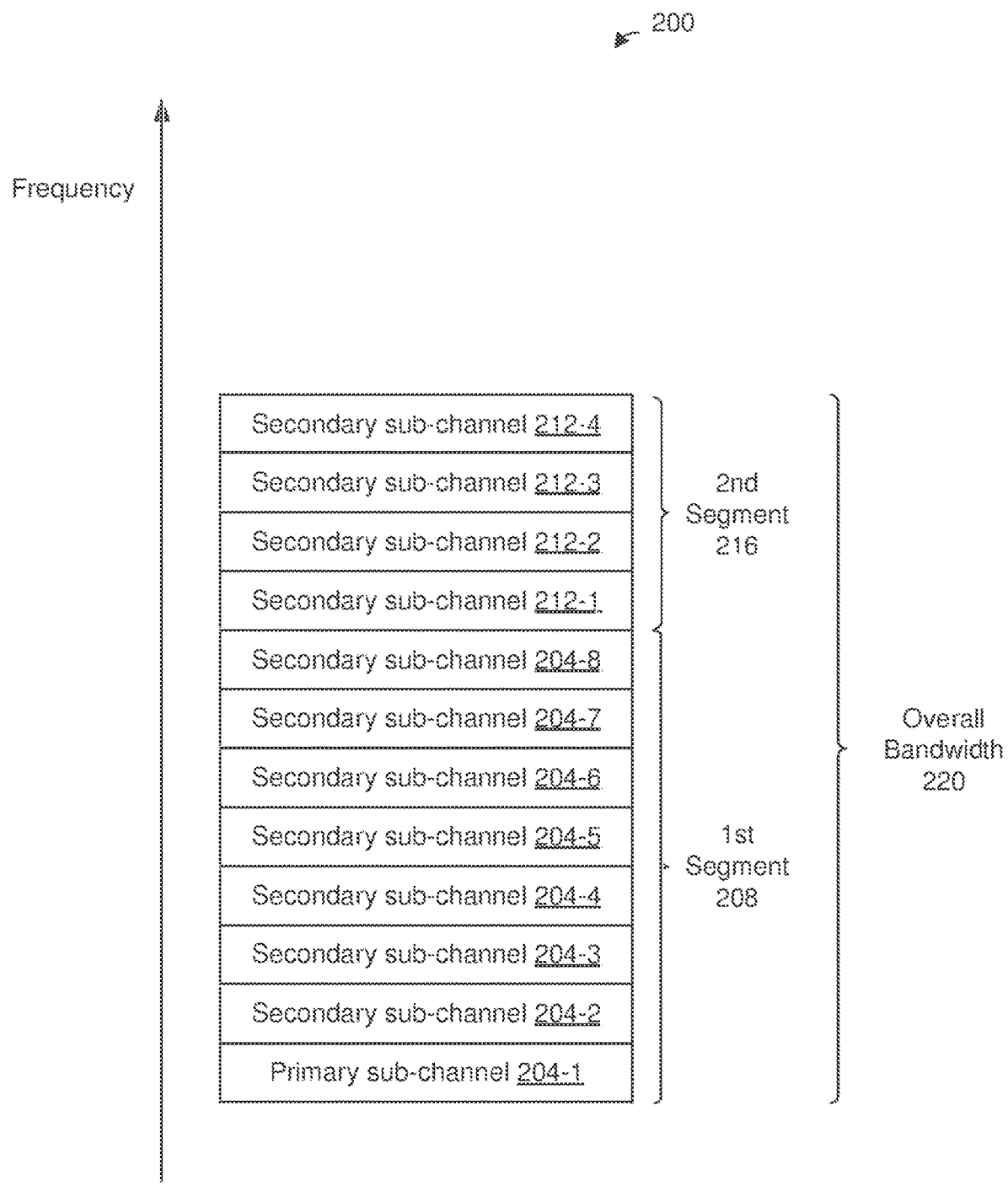
FIG. 2A is a diagram of an example communication channel used by the communication system of FIG. 1, the communication channel corresponding to multiple frequency segments, according to an embodiment.

FIG. 2A is a diagram of an example operating channel 200 that is used in the communication system 110 of FIG. 1, according to an embodiment. The operating channel 200 comprises a plurality of subchannels 204 in a first frequency segment 208 and a plurality of subchannels 212 in a second frequency segment 216. The operating channel 200 spans an overall bandwidth 220. In an embodiment, the first segment 208 and the second segment 216 are within a same radio frequency (RF) band.

In other embodiments, the first segment 208 and the second segment 216 are in different RF bands. The Federal Communication Commission (FCC) now permits wireless local area networks (WLANs) to operate in multiple RF bands, e.g., the 2.4 GHZ band (approximately 2.4 to 2.5 GHZ), and the 5 GHz band (approximately 5.170 to 5.835 GHz). Recently, the FCC proposed that WLANs can also operate in the 6 GHz band (5.925 to 7.125 GHZ). Regulatory agencies in other countries/regions also permit WLAN operation in the 2.4 GHz and 5 GHz bands, and are considering permitting WLAN operation in the 6 GHz band. A future WLAN protocol, now under development, may permit multi-band operation in which a WLAN can use spectrum in multiple RF bands at the same time.

In some embodiments, the first frequency segment 208 is used as a first communication link and the second frequency segment 216 is used as a second communication link, where the first communication link and the second communication link are used for simultaneous transmissions.

In one embodiment, each of the subchannels 204/212 spans 20 MHz. Thus, as illustrated in FIG. 2A, the first segment 208 spans 160 MHz and the second segment 216 spans 80 MHz. In other embodiments, the first frequency segment 208 includes another suitable number of subchannels 204 (e.g., one, two, four, etc.) and spans another suitable bandwidth, such as 20 MHz, 40 MHZ, 80 MHZ, etc., and/or the second frequency segment 216 includes another suitable number of subchannels 212 (e.g., one, two, eight, etc.) and spans another suitable bandwidth, such as 20 MHz, 40 MHz, 160 MHz, etc.

One subchannel 204-1 in the first frequency segment 208 is designated as a primary subchannel and the other subchannels 204/212 are designated as secondary subchannels. Control and/or management frames are transmitted in the primary subchannel 204-1, according to some embodiments. In some embodiments, the primary subchannel must be idle in order for any of the subchannels 204/212 to be used for a transmission, according to some embodiments. In some embodiments, a subchannel 212 in the second frequency segment 216 is also designated as a primary subchannel (not shown). In some embodiments in which the second frequency segment 216 also includes a primary subchannel, control and/or management frames are additionally or alternatively transmitted in the primary subchannel of the second frequency segment 216, at least in some scenarios. In other embodiments, control and/or management frames are only transmitted in the primary subchannel 204-1 of the first frequency segment 208.

In some embodiments in which the second frequency segment 216 also includes a primary subchannel, the primary subchannel 204-1 of the first frequency segment 208 must be idle in order for any of the subchannels 204 to be used for a transmission and the primary subchannel of the second frequency segment 216 must be idle in order for any of the subchannels 212 to be used for a transmission, according to some embodiments. In other embodiments, one or more of the secondary subchannels 204 may be used for a transmission even when the primary subchannel 204-1 is not idle, and/or one or more of the secondary subchannels 212 may be used for a transmission even when the primary subchannel of the second frequency segment 216 is not idle, according to some embodiments.

In other embodiments, no subchannel 212 in the second segment 216 is designated as a primary subchannel.

In an embodiment, a backoff counter 142/192 (FIG. 1) corresponds to a primary subchannel of the operating channel 200, e.g., the backoff counter 142/192 is decremented when the primary subchannel is idle and the backoff counter 142/192 is paused when the primary subchannel is busy. In an embodiment, a respective backoff counter 142/192 (FIG. 1) corresponds to a respective primary subchannel of the operating channel 200, e.g., the respective backoff counter 142/192 is decremented when the respective primary subchannel is idle and the respective backoff counter 142/192 is paused when the respective primary subchannel is busy.

Figure 2B:
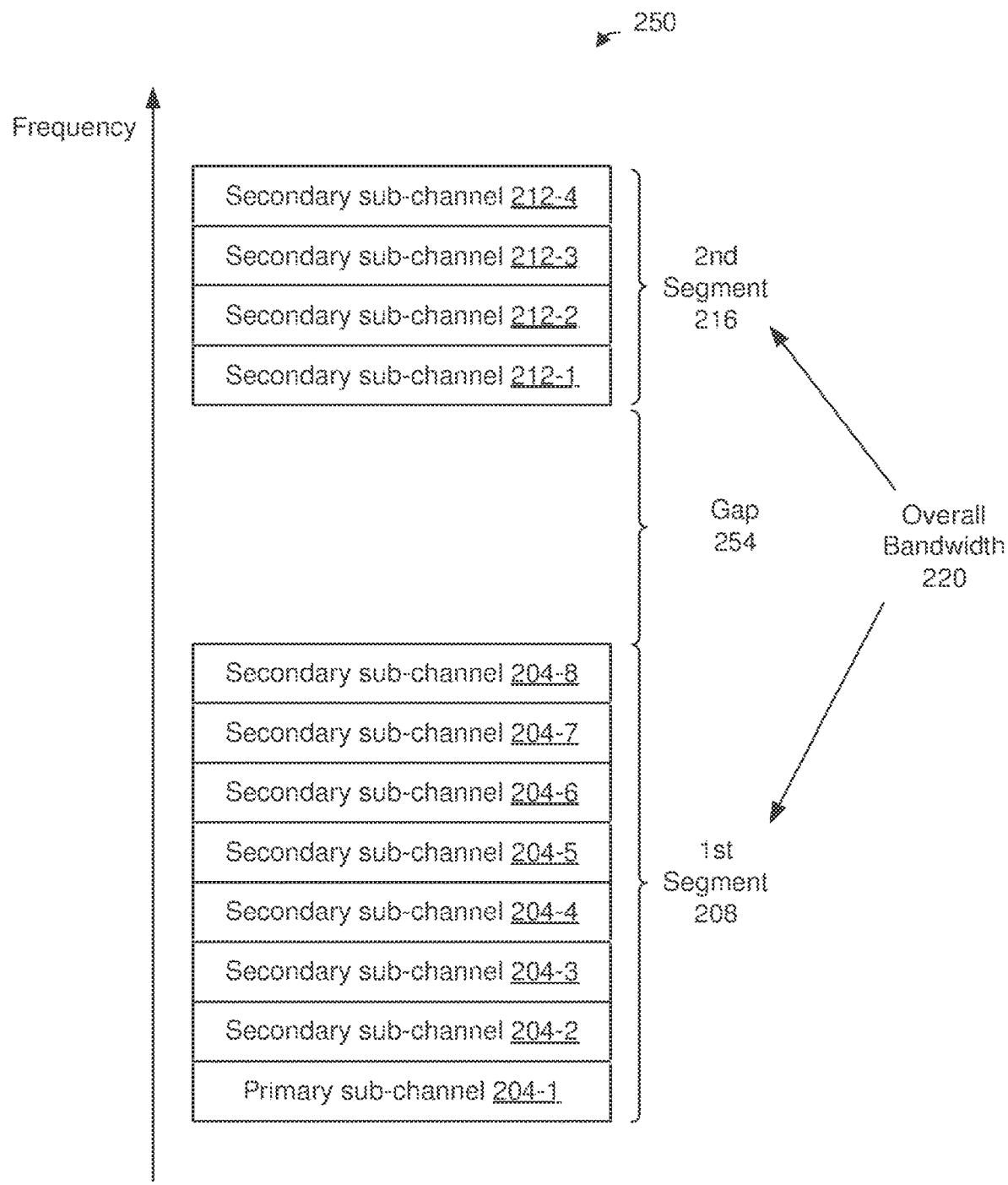
FIG. 2B is a diagram of another example communication channel used by the communication system of FIG. 1, the communication channel corresponding to multiple frequency segments, according to another embodiment.

FIG. 2B is a diagram of another example operating channel 250 that is used in the communication system 110 of FIG. 1, according to another embodiment. The operating channel 250 is similar to the example operating channel 200 of FIG. 2A, and like-numbered elements are not described in detail for brevity. In the example operating channel 250 the first frequency segment 208 and the second frequency segment 216 are separated by a gap 254 in frequency. In some embodiments, the first frequency segment 208 and the second frequency segment 216 are in a same RF band. In other embodiments, the first frequency segment 208 and the second frequency segment 216 are in different RF bands.

In an embodiment, a backoff counter 142/192 (FIG. 1) corresponds to a primary subchannel of the operating channel 250, e.g., the backoff counter 142/192 is decremented when the primary subchannel is idle and the backoff counter 142/192 is paused when the primary subchannel is busy. In an embodiment, a respective backoff counter 142/192 (FIG. 1) corresponds to a respective primary subchannel of the operating channel 250, e.g., the respective backoff counter 142/192 is decremented when the respective primary subchannel is idle and the respective backoff counter 142/192 is paused when the respective primary subchannel is busy.

Referring now to FIGS. 2A and 2B, one or more of the subchannels 204/212 are "punctured" (not shown in FIGS. 2A and 2B, e.g., nothing is transmitted within the "punctured" subchannels, according to some embodiments.

Although the example operating channels 200 and 250 of FIGS. 2A-B are illustrated as including two frequency segments 208/216, other suitable operating channels include three or more frequency segments (e.g., include a third frequency segment, include a third frequency segment and a fourth frequency segment, etc.). In some embodiments, a third frequency segment is separated from the second frequency segment 216 by a gap in frequency in which nothing is transmitted, similar to the gap 254. In some embodiments, a third frequency segment is contiguous in frequency with the second frequency segment 216.

In some embodiments, respective frequency segments such as illustrated in FIGS. 2A-B are associated with different MAC addresses. For example, in embodiments in which the respective frequency segments are uses as respective communication links, the respective communication links correspond to different MAC addresses.

Figure 3:
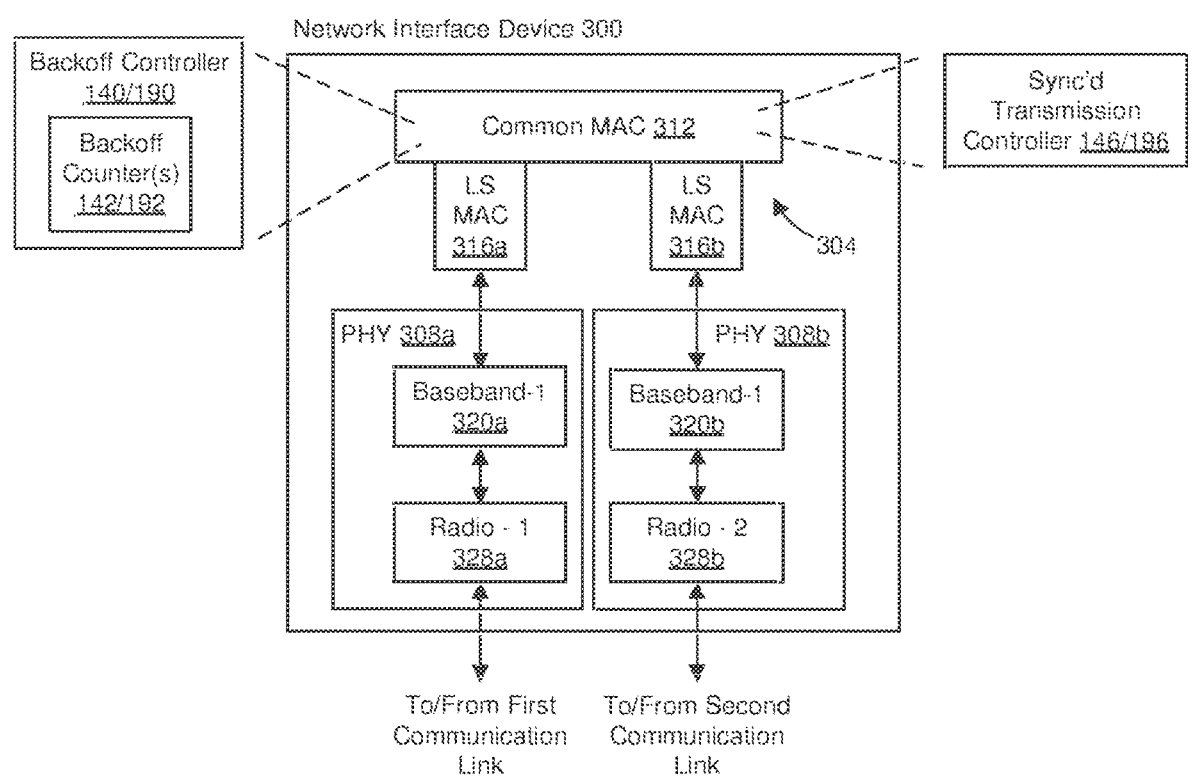
FIG. 3 is a block diagram of an example wireless network interface device configured to communicate via multiple frequency segments, according to an embodiment.

FIG. 3 is a diagram of an example network interface device 300 configured for simultaneous communication via multiple communication links in respective frequency segments, according to an embodiment. The network interface device 300 is an embodiment of the network interface device 122 of the AP 114 of Fig. The network interface device 300 is an embodiment the network interface device 162 of the client station 154-1 of FIG. 1. In other embodiments, the network interface device 122 and/or the network interface device 162 have a different suitable structure than the network interface device 300. Additionally, in some embodiments, the network interface device 300 is used in another suitable communication device than the communication devices of FIG. 1, and/or is used in another suitable wireless network than the wireless network of FIG. 1

The network interface device 300 is configured for simultaneous communication via a first communication link in a first frequency segment and a second communication link in a second frequency segment, in the illustrated embodiment.

The network interface device 300 includes a MAC processor 304 coupled to a PHY processors 308. The MAC processor 304 exchanges frames (or PSDUs) with the PHY processors 308.

In an embodiment, the MAC processor 304 corresponds to the MAC processor 126 of FIG. 1. In another embodiment, the MAC processor 304 corresponds to the MAC processor 166 of FIG. 1. In an embodiment, the PHY processors 308 corresponds to the one or more PHY processors 130 of FIG. 1. In another embodiment, the PHY processors 308 corresponds to the one or more PHY processors 170 of FIG. 1.

The MAC processor 304 includes common MAC logic 312 and link specific (LS) MAC logic 316. The common MAC logic 312 generally implements MAC layer functions that are common to the multiple communication links. For instance, the common MAC logic 312 is configured to, in response to receiving data (e.g., from a host processor (not shown), from a wired communication link (not shown), etc.) that is to be forwarded to another communication device in the WLAN, encapsulate the data in MAC layer data units such as MSDUs, MPDUs, aggregate MPDUs (A-MPDUs), etc., for transmission via the multiple communication links and to decapsulate data from MSDUs, MPDUs, A-MPDUs, etc., that were received via the multiple communication links. Additionally, the common MAC logic 312 is configured to select communication links via which MAC layer data units should be transmitted, in some embodiments.

Each LS MAC logic 316 generally implements MAC layer functions that are specific to the particular communication link to which the LS MAC logic 316 corresponds. For example, the LS MAC logic 316a is configured to determine when the first communication link is idle and available for transmission, and the LS MAC logic 316b is configured to determine when the second communication link is idle and available for transmission, in some embodiments. In some embodiments, each LS MAC logic 316 is associated with a respective network address (e.g., a MAC address), i.e., the LS MAC logic 316a is associated with a first network address (e.g., a first MAC address) and the LS MAC logic 316a is associated with a second network address (e.g., a second MAC address) that is different than the first network address.

In some embodiments, the common MAC logic 312 implements the backoff controller 140/190 discussed above with reference to FIG. 1. In some embodiments, the common MAC logic 312 additionally or alternatively implements the synchronized transmission controller 196 discussed above with reference to FIG. 1. In some embodiments, some or all of the backoff controller 140/190 is implemented as respective link specific backoff controllers 140/190 in respective LS MAC logic 316.

The PHY processor 308a includes a baseband signal processor 320a corresponding to the first communication link, and the PHY processor 308b includes a baseband signal processor 320b corresponding to the second communication link. The PHY processor 308a also includes a first RF radio (Radio-1) 328a corresponding to the first communication link, and the PHY processor 308b includes a second RF radio (Radio-2) 328b corresponding to the second communication link. The baseband signal processor 320a is coupled to the first RF radio 328a and the baseband signal processor 320b is coupled to the second RF radio 328b. In an embodiment, the RF radio 328a and the RF radio 328b correspond to the transceivers 134 of FIG. 1. In another embodiment, the RF radio 328a and the RF radio 328b correspond to the transceivers 174 of FIG. 1. In an embodiment, the RF radio 328a is configured to operate on a first RF band, and the RF radio 328b is configured to operate on a second RF band. In another embodiment, the RF radio 328a and the RF radio 328b are both configured to operate on the same RF band.

In an embodiment, the baseband signal processors 320 are configured to receive frames (or PSDUs) from the MAC processor 304, and encapsulate the frames (or PSDUs) into respective packets and generate respective baseband signals corresponding to the respective packets.

The baseband signal processor 320a provides the respective baseband signal generated by the baseband signal processor 320a to the Radio-1 328a. The baseband signal processor 320b provides the respective baseband signal generated by the baseband signal processor 320b to the Radio-1 328b. The Radio-1 328a and Radio-2 328b upconvert the respective baseband signals to generate respective RF signals for transmission via the first communication link and the second communication link, respectively. The Radio-1 328a transmits a first RF signal via the first frequency segment and the Radio-2 328b transmits a second RF signal via the second frequency segment.

The Radio-1 328a and the Radio-2 328b are also configured to receive respective RF signals via the first communication link and the second communication link, respectively. The Radio-1 328a and the Radio-2 328b generate respective baseband signals corresponding to the respective received signals. The generated respective baseband signals are provided to the respective baseband signal processors 320a and 320b. The respective baseband signal processors 320a and 320b generate respective PSDUs corresponding to the respective received signals, and provide the respective PSDUs to the MAC processor 304. The MAC processor 304 processes the PSDUs received from the baseband signal processors 320a and 320b, in an embodiment.

In some embodiments, the common MAC logic 312 and/or the LS MAC logic 316 are implemented, at least partially, by a processor configured to execute machine readable instructions stored in a memory device (not shown) such as a RAM, a ROM, a flash memory, etc. In other embodiments, the common MAC logic 312 and/or the LS MAC logic 316 are implemented, additionally or alternatively, by hardware logic such as one or more hardware state machines.

In some embodiments, the baseband signal processors 320 are implemented, at least partially, by a processor configured to execute machine readable instructions stored in a memory device (not shown) such as a RAM, a ROM, a flash memory, etc. In other embodiments, the baseband signal processors 320 are implemented, additionally or alternatively, by hardware logic such as one or more hardware state machines, hardware calculators (e.g., FFT calculators, IFFT calculators), hardware modulators, etc.

Although the example network interface 300 illustrated in FIG. 3 includes a single MAC processor 304, other suitable network interface devices include multiple MAC processors, with respective ones of the multiple MAC processors 304 corresponding to respective ones of the communication links, in some embodiments. Although the example network interface 300 illustrated in FIG. 3 includes multiple PHY processors 308, other suitable network interface devices include a single PHY processor with multiple RF radios corresponding to respective ones of the communication links, in some embodiments. In some embodiments, the single PHY processor includes multiple baseband processors 320, while in other embodiments the single PHY processor includes a single baseband processor that is configured to generate multiple baseband signals corresponding to respective communication links, and to process multiple baseband signals received from the multiple RF radios.

In some wireless networks, one or more communication devices in the wireless network may not be capable of simultaneously transmitting and receiving via different frequency segments, e.g., because of physical limitations of the communication device, channel conditions, etc. Additionally or alternatively, the AP 114 may determine that simultaneously transmission and reception via different frequency segments is not allowed in a WLAN, e.g., because of physical limitations of one or more communication devices in the WLAN, channel conditions, etc.

A client station 154 informs the AP 114 whether the client station 154 is capable of simultaneously transmitting and receiving via different frequency segments, according to an embodiment. For example, during a setup phase of an operational channel having multiple frequency links (sometimes referred to as a "multi-ink association"), the client station 154 transmits to the AP 114 a frame (e.g., a management frame, a control frame, an action frame, etc.) that includes information indicating whether the client station 154 is capable of simultaneously transmitting and receiving, according to an embodiment. As another example, when joining or seeking to join a WLAN managed by the (sometimes referred to as a "multi-ink association"), the client station 154 transmits to the AP 114 a frame (e.g., an association request frame, a reassociation request frame, a probe request frame, etc.) that includes information indicating whether the client station 154 is capable of simultaneously transmitting and receiving, according to an embodiment.

The AP 114 informs one or more client stations 154 whether simultaneous transmission and reception via different frequency segments is permitted in the WLAN 110, according to an embodiment. For example, during a setup phase of an operational channel having multiple frequency links (sometimes referred to as a "multi-ink association"), the AP 114 transmits to one or more client stations 154 a frame (e.g., a management frame, a control frame, an action frame, etc.) that includes information indicating whether simultaneous transmission and reception via different frequency segments is permitted in the WLAN 110, according to an embodiment. As another example, when a client station 154 seeks to join the WLAN 110 managed by the (sometimes referred to as a "multi-ink association"), the AP 114 transmits to the client station 154 a frame (e.g., an association response frame, a reassociation response frame, a probe response frame, etc.) that includes information indicating whether simultaneous transmission and reception via different frequency segments is permitted in the WLAN 110, according to an embodiment. As another example, the AP 114 periodically transmits a beacon frame that includes information indicating whether simultaneous transmission and reception via different frequency segments is permitted in the WLAN 110, according to an embodiment. As another example, when the AP 114 decides to switch from allowing simultaneous transmission and reception via different frequency segments to not permitting simultaneous transmission and reception via different frequency segments, or vice versa, the AP 114 transmits a frame (e.g., a management frame, a control frame, an action frame, etc.) that includes information indicating whether simultaneous transmission and reception via different frequency segments is permitted in the WLAN 110, according to an embodiment.

In some embodiments, when simultaneous transmission/reception in multiple frequency segments is not permitted (e.g., one or more of i) a first communication device does not permit simultaneous transmission/reception in multiple frequency segments, ii) a second communication device does not permit simultaneous transmission/reception in multiple frequency segments, iii) simultaneous transmission/reception in multiple frequency segments is not permitted in the WLAN, etc.) and the first communication device is transmitting unsynchronized transmissions in multiple frequency segments (e.g., multiple transmissions in multiple frequency segments do not begin at a same time), the first communication device ends the unsynchronized transmissions in the multiple frequency segments at a same time. When one or more of the unsynchronized transmissions in the multiple frequency segments prompts another communication device to transmit an acknowledgment, ending the unsynchronized transmissions at a same time helps to avoid the one communication device transmitting in one frequency segment at the same time that the other communication is transmitting an acknowledgment in another frequency segment, in some embodiments.

Figure 4:
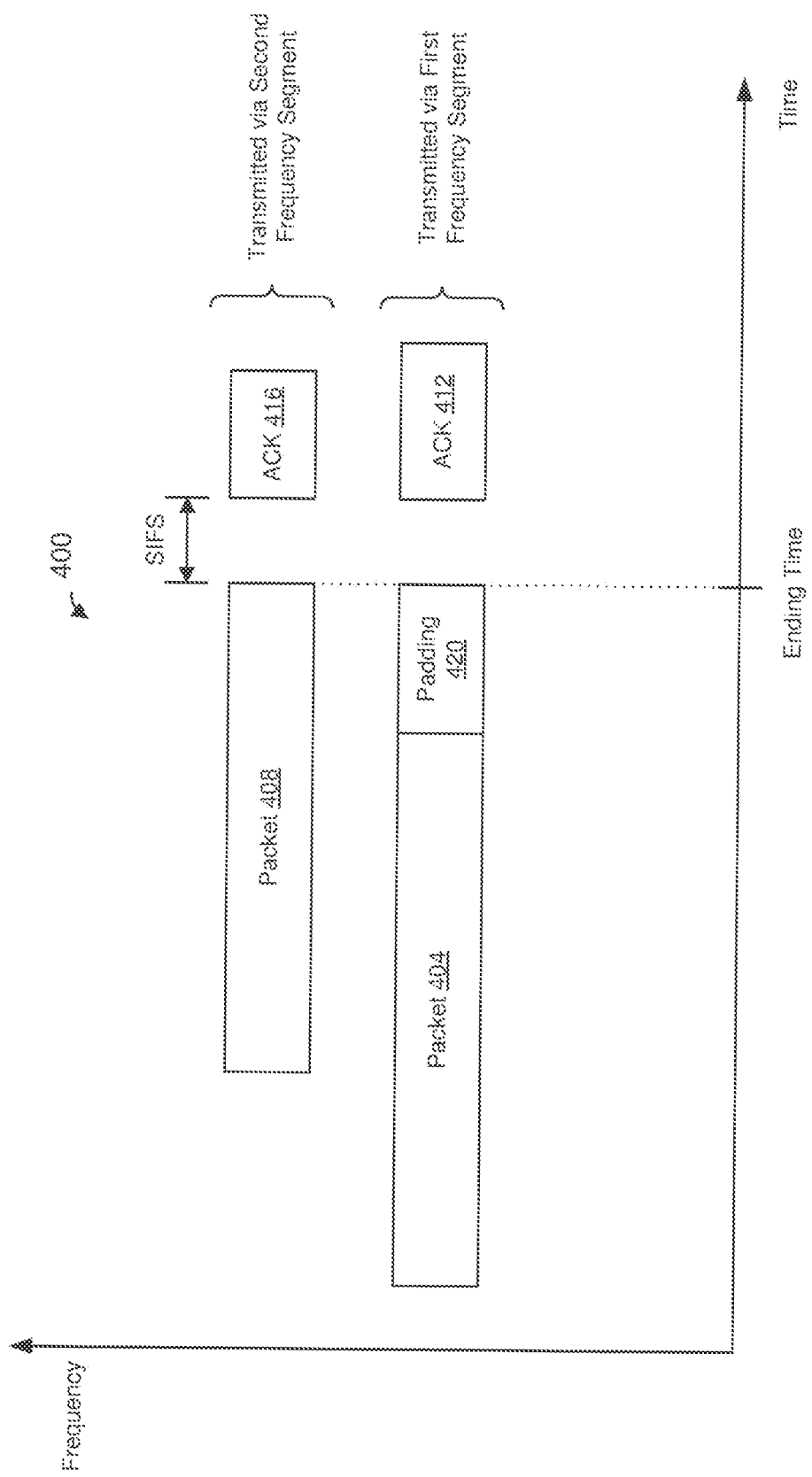
FIG. 4 is a diagram of an example of unsynchronized transmissions in multiple frequency segments, according to an embodiment.

FIG. 4 is a diagram of an example of unsynchronized transmissions 400 in multiple frequency segments corresponding to multiple communication links, according to an embodiment. A first communication device transmits a first packet 404 in a first frequency segment corresponding to a first communication link and simultaneously transmits a second packet 408 in a second frequency segment corresponding to a second communication link. Transmission of the first packet 404 begins prior to a beginning of transmission of the second packet 408, thus transmission of the first packet 404 and transmission the second packet 408 begin at different times.

The first communication device receives a first acknowledgment 412 (e.g., an acknowledgment frame, a block acknowledgment (BA) frame, etc., included in a packet) in the first frequency segment that is responsive to the first packet 404. In an embodiment, a communication device that receives the packet 404 begins transmission of the first acknowledgment 412 a defined time period after an end of reception of the packet 40. In an embodiment, the defined time period is a short interframe space (SIFS) as defined by the IEEE 802.11 Standard. In other embodiments, the defined time period is another suitable time duration.

Similarly, the first communication device receives a second acknowledgment 416 (e.g., an acknowledgment frame, a BA frame, etc., included in a packet) in the second frequency segment that is responsive to the second packet 408. In an embodiment, a communication device that receives the second packet 408 begins transmission of the second acknowledgment 416 a defined time period after an end of reception of the second packet 408. In an embodiment, the defined time period is SIFS as defined by the IEEE 802.11 Standard. In other embodiments, the defined time period is another suitable time duration.

To avoid transmission of the second packet 408 occurring simultaneously with reception of the acknowledgment 412, the first communication device includes padding information 420 in the packet 404 so that an end of transmission of the packet 404 occurs at a same time as an end of transmission of the packet 408. In the illustrative example of FIG. 4, if the padding information 420 was not included in the packet 404, reception of the acknowledgment 412 would occur earlier and overlap with transmission of the packet 408. However, by including the padding information 420 the start of reception of the acknowledgment 412 is delayed until after an end of transmission of the second packet 408.

In some embodiments, if multiple transmissions in respective frequency segments do not prompt acknowledgments that begin the defined time period (e.g., SIFS or another suitable time duration) after an end of the transmission, the transmissions are permitted to end at different times, and thus padding such as padding 420 is not added to a packet. In other embodiments, even if multiple transmissions in respective frequency segments do not prompt acknowledgments that begin the defined time period (e.g., SIFS or another suitable time duration) after an end of the transmission, the transmissions are required to end at a same time.

In some embodiments, if simultaneous transmission and reception in respective frequency segments is permitted, the transmissions are permitted to end at different times, and thus padding such as padding 420 is not added to a packet. In other embodiments, even if simultaneous transmission and reception in respective frequency segments is permitted, padding such as padding 420 is added to a packet so that the transmissions end at a same time.

Although FIG. 4 illustrates an example simultaneously transmitting two packets in two frequency segments, in other embodiments three or more packets are simultaneously transmitted in three or more respective frequency segments. In some embodiments, padding is added to two or more packets (similar to the packet 404) so that transmissions of all of the three or packets end at a same time.

Figure 5:
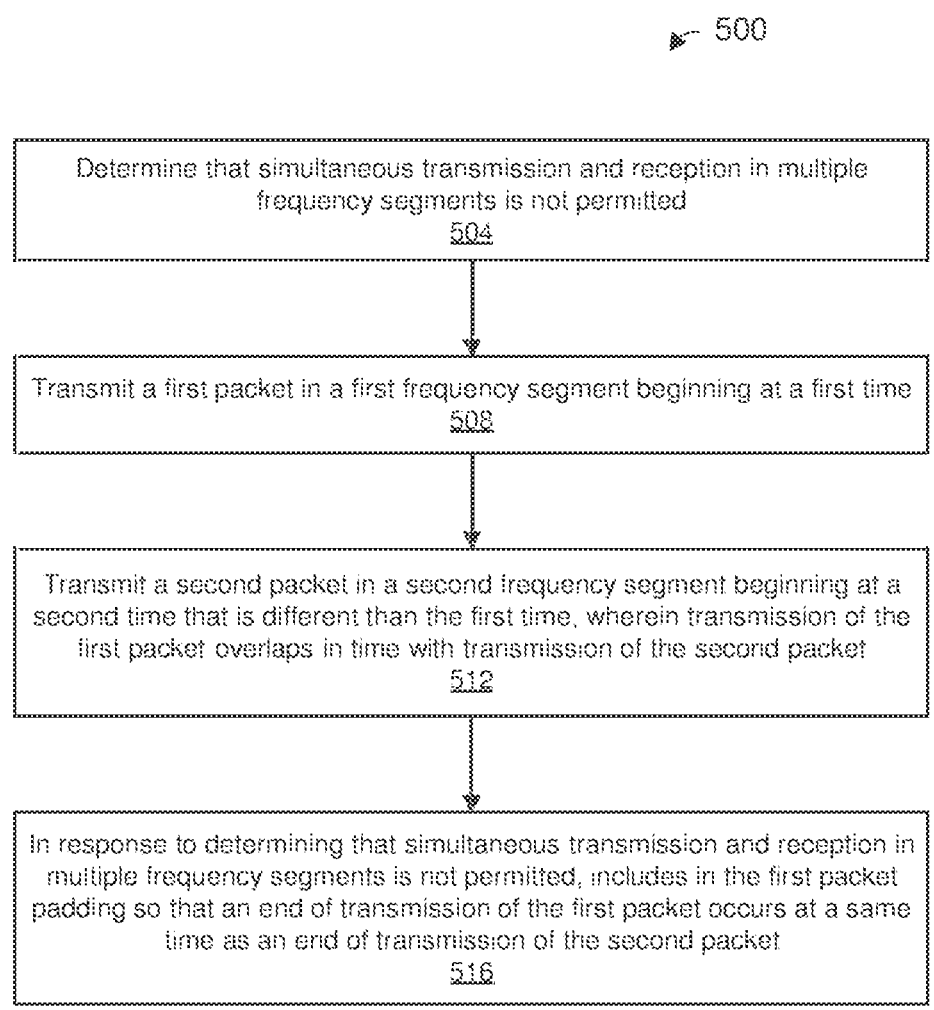
FIG. 5 is a flow diagram of an example method for simultaneously transmitting in multiple frequency segments, according to an embodiment.

FIG. 5 is a flow diagram of an example method 500 for simultaneously transmitting in multiple frequency segments, according to an embodiment. In some embodiments, the multiple frequency segments correspond to respective communication links. In some embodiments, the AP 114 and/or the client station 154 is configured to implement the method 500, and FIG. 5 is described with reference to FIG. 1 merely for explanatory purposes. In other embodiments, the method 500 is implemented by another suitable communication device.

At block 504, a communication device determines (e.g., the network interface 122 determines, the MAC processor 126 determines, the synchronized transmission controller 146 determines, the network interface 162 determines, the MAC processor 166 determines, the synchronized transmission controller 196 determines, etc.) that simultaneous transmission and reception via multiple frequency segments is not permitted. For example, determining at block 504 that simultaneous transmission and reception is not permitted includes one or more of (or none of) i) determining that the communication device implementing the method 400 is not permitted to simultaneously transmit and receive in multiple frequency segments, ii) determining that another communication device to which the communication device will be transmitting as part of the method 400 is not permitted to simultaneously transmit and receive in multiple frequency segments, and iii) determining that simultaneous transmission and reception via multiple frequency segments is not permitted in a WLAN in which the communication device operates, according to various embodiments.

In some embodiments, determining at block 504 that simultaneous transmission and reception via multiple frequency segments is not permitted includes determining that the communication device is not permitted to simultaneously transmit and receive via multiple frequency segments.

In some embodiments, determining at block 504 that simultaneous transmission and reception via multiple frequency segments is not permitted includes receiving from another communication device a packet that includes information indicating that the other communication device is not permitted to simultaneously transmit and receive via multiple frequency segments, where the communication device will be transmitting to the other communication device as part of the method 400. In some embodiments, determining at block 504 that simultaneous transmission and reception via multiple frequency segments is not permitted includes receiving from an AP a packet that includes information indicating that simultaneous transmission and reception via multiple frequency segments is not permitted in a WLAN that is managed by the AP.

At block 508, the communication device transmits (e.g., the network interface 122 transmits, the PHY processor 130 transmits, the network interface 162 transmits, the PHY processor 170 transmits, etc.) a first packet in a first frequency segment beginning at a first time. At block 512, the communication device transmits (e.g., the network interface 122 transmits, the PHY processor 130 transmits, the network interface 162 transmits, the PHY processor 170 transmits, etc.) a second packet in a second frequency segment beginning at a second time that is different than the first time. Transmission of the second packet at block 512 overlaps in time with transmission of the first packet at block 508.

At block 516, in response to having determined at block 504 that simultaneous transmission and reception via multiple frequency segments is not permitted, the communication device includes (e.g., the network interface 122 includes, the PHY processor 130 includes, the network interface 162 includes, the PHY processor 170 includes, etc.) in the first packet padding so that an end of transmission of the first packet occurs at a same time as an end of transmission of the second packet. In some embodiments, a MAC processor (e.g., the MAC processor 126, the MAC processor 166, etc.) instructs a PHY processor (e.g., the PHY processor 130, the PHY processor 170, etc.) to include padding in the first packet so that the end of transmission of the first packet occurs at the same time as the end of transmission of the second packet, and the PHY processor (e.g., the PHY processor 130, the PHY processor 170, etc.) determines an amount of padding to include in the first packet so that the end of transmission of the first packet occurs at the same time as the end of transmission of the second packet.

In some embodiments, if the communication device had determined at block 504 that simultaneous transmission and reception via multiple frequency segments is not permitted, the communication device does not include (e.g., the network interface 122 does not include, the PHY processor 130 does not include, the network interface 162 does not include, the PHY processor 170 does not include, etc.) in the first packet padding so that an end of transmission of the first packet occurs at a same time as an end of transmission of the second packet. In some embodiments, a MAC processor (e.g., the MAC processor 126, the MAC processor 166, etc.) instructs a PHY processor (e.g., the PHY processor 130, the PHY processor 170, etc.) to not include padding in the first packet so that the end of transmission of the first packet occurs at the same time as the end of transmission of the second packet, and the PHY processor (e.g., the PHY processor 130, the PHY processor 170, etc.). In some embodiments, padding is nonetheless added for other purposes other than for ensuring that the end of transmission of the first packet occurs at the same time as the end of transmission of the second packet, such as to ensure that the modulated information ends on an OFDM symbol boundary, to add a packet extension to allow a receiver device more time to generate a response to the packet, etc.

In some embodiments, a communication device in a WLAN simultaneously and synchronously transmits in multiple frequency segments, e.g., the multiple transmissions in multiple frequency segments begin at a same time. In some embodiments, a communication device in a WLAN is configured to both: i) simultaneously transmit in multiple frequency segments, where the multiple transmissions in multiple frequency segments are required to begin at a same time, and ii) simultaneously and synchronously transmits in multiple frequency segments, e.g., the multiple transmissions in multiple frequency segments are required to begin at a same time. For example, in some embodiments, at some times and/or in some situations, simultaneously transmissions in multiple frequency segments are required to begin at a same time, whereas at other times and/or in other situations, simultaneously transmissions in multiple frequency segments are permitted to begin at different times. As an example, whether simultaneous transmissions in multiple frequency segments are required to begin at a same time depends on a distance, in frequency, between the multiple frequency segments, according to some embodiments. For instance, in an illustrative embodiment, when a first frequency segment is in the 2.4 GHz band and a second frequency segment is in the 6 GHz band, simultaneous transmissions in multiple frequency segments are permitted to begin different times. On the other hand, as another example, when a first frequency segment is in the 5 GHz band and a second frequency segment is in the 6 GHz band, or if the first and second frequency segments are in the same RF band, simultaneous transmissions in multiple frequency segments are required to begin at a same time, according to another illustrative embodiment.

In some embodiments involving simultaneous and synchronous transmissions in multiple frequency segments, the communication device performs respective backoff operations (using multiple backoff counters) in multiple frequency segments (e.g., a respective backoff operation in each of the multiple frequency segments) and begins the simultaneous and synchronous transmissions in multiple frequency segments in response to all of the backoff counters expiring (e.g., all of the backoff counters reaching zero).

Figure 6:
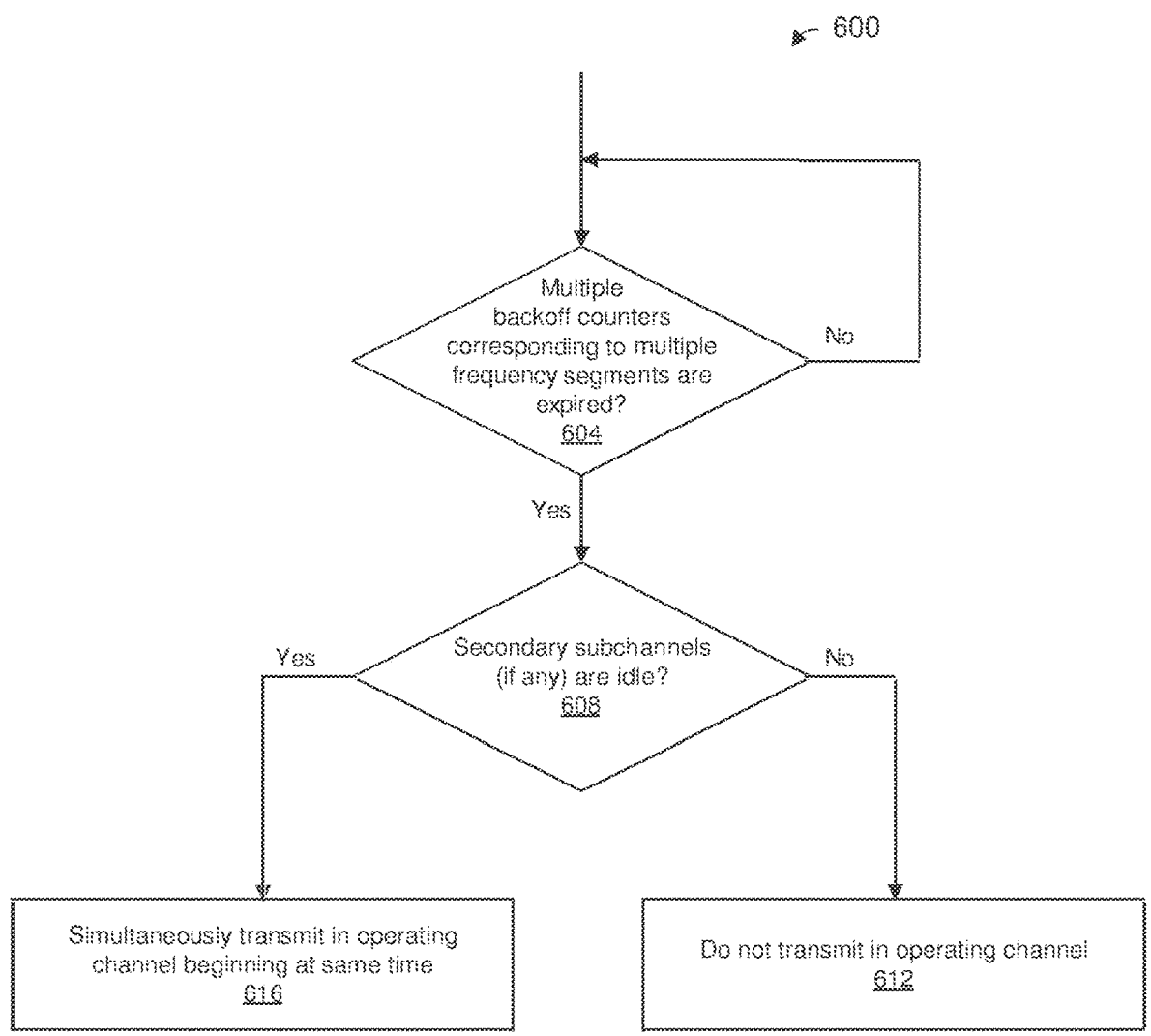
FIG. 6 is a flow diagram of another example method for simultaneously transmitting in multiple frequency segments, according to an embodiment.

FIG. 6 is a flow diagram of an example method 600 for simultaneously transmitting in multiple frequency segments beginning at a same time, according to another embodiment. In some embodiments, the multiple frequency segments correspond to respective communication links. In some embodiments, the AP 114 and/or the client station 154 are configured to implement the method 600, and FIG. 6 is described with reference to FIG. 1 merely for explanatory purposes. In other embodiments, the method 500 is implemented by another suitable communication device.

At block 604, a communication device determines (e.g., the network interface 122 determines, the MAC processor 126 determines, the backoff controller 140 determines, the network interface 162 determines, the MAC processor 166 determines, the backoff controller 190 determines, etc.) whether multiple backoff counters (e.g., backoff counters 142, backoff counters 192, etc.) corresponding to multiple frequency segments of an operating channel are expired (e.g., have reached zero). For example, in an embodiment, the communication device maintains (e.g., the network interface 122 maintains, the MAC processor 126 maintains, the backoff controller 140 maintains, the network interface 162 maintains, the MAC processor 166 maintains, the backoff controller 190 maintains, etc.) respective backoff counters 142/192 for respective frequency segment. In an embodiment, each backoff counter 142/192 corresponds to a respective subchannel in the respective frequency segment, and the backoff counter 142/192 is decremented when the respective subchannel is determined to be idle and is suspended when the respective subchannel is determined to be busy. In an embodiment, each backoff counter 142/192 corresponds to a respective primary subchannel in the respective frequency segment, and the backoff counter 142/192 is decremented when the respective primary subchannel is determined to be idle and is suspended when the respective primary subchannel is determined to be busy.

In response to determining, at block 604, that not all of the multiple backoff counters are expired (e.g., that one or more of the backoff counters are not expired), the communication device waits (e.g., the network interface 122 waits, the MAC processor 126 waits, the backoff controller 140 waits, the network interface 162 waits, the MAC processor 166 waits, the backoff controller 190 waits, etc.) until all of the multiple backoff counters are expired.

In some embodiments, when one backoff counter is expired but one or more other backoff counters are not expired, the method 600 includes waiting until all of the backoff counters are expired.

In response to determining, at block 604, that all of the multiple backoff counters are expired, the flow proceeds to block 608. At block 608, the communication device determines whether all of any secondary subchannels in the operating channel are idle for a determined time period prior to a beginning of transmission in the operating channel. In an embodiment, the defined time period is a suitable time duration such as a point coordination function (PCF) interframe space (PIFS) as defined by the IEEE 802.11 Standard. In other embodiments, the defined time period is another suitable time duration such as a distributed coordination function (DCF) interframe space (DIFS) as defined by the IEEE 802.11 Standard, SIFS as defined by the IEEE 802.11 Standard, or another suitable time duration.

In response to determining, at block 608, that not all of the secondary subchannels in the operating channel are idle for the determined time period prior to the beginning of transmission in the operating channel (e.g., that one or more of the secondary subchannels are busy), the flow proceeds to block 612. At block 612, a transmission in the operating channel is not performed. In some embodiments, in connection with block 612, the multiple backoff counters are reset and the flow 600 is repeated. In another embodiment, a transmission in i) multiple primary subchannels corresponding to the multiple backoff counters and ii) one or more secondary subchannels that are idle (if any) is performed.

On the other hand, in response to determining, at block 608, that all of the secondary subchannels in the operating channel are idle for the determined time period prior to the beginning of transmission in the operating channel (e.g., that one or more of the secondary subchannels are busy), the flow proceeds to block 616. At block 616, a transmission in the operating channel is performed, including simultaneously transmitting in multiple frequency segments beginning at a same time.

Figure 7:
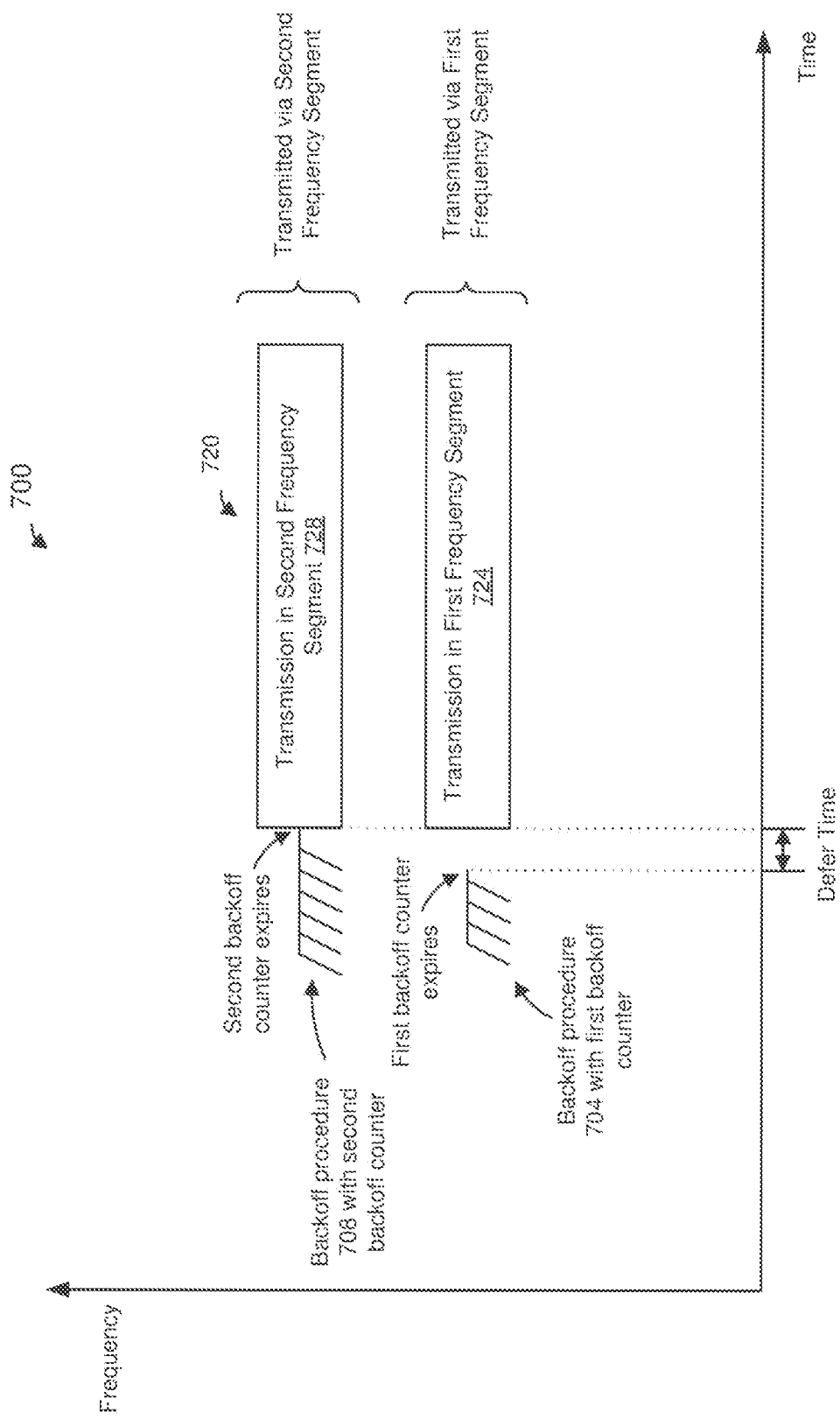
FIG. 7 is a diagram of an example of synchronized and simultaneous transmissions in multiple frequency segments, according to an embodiment.

FIG. 7 is a diagram of an illustrative example of a simultaneous transmission in multiple frequency segments beginning at a same time, according to an embodiment. The transmission 700 is performed in accordance with the method 600 of FIG. 6, in some embodiments. In other embodiments, the transmission 700 is performed in accordance with another suitable method for simultaneously transmitting in multiple frequency segments beginning at a same time.

The transmission 700 is within an operating channel that includes a first frequency segment and a second frequency segment. In some embodiments, the first frequency segment corresponds to a first communication link and the second frequency segment corresponds to a second communication link.

A communication device performs (e.g., the network interface 122 performs, the MAC processor 126 performs, the backoff controller 140 performs, the network interface 162 performs, the MAC processor 166 performs, the backoff controller 190 performs, etc.) a first backoff procedure 704 in connection with a first frequency segment, and performs (e.g., the network interface 122 performs, the MAC processor 126 performs, the backoff controller 140 performs, the network interface 162 performs, the MAC processor 166 performs, the backoff controller 190 performs, etc.) a second backoff procedure 708 in connection with a second frequency segment.

In some embodiments, performing the backoff procedure 704 includes decrementing a first backoff counter when a subchannel within the first frequency segment is determined to be idle, and pausing decrementing of the first backoff counter when the subchannel within the first frequency segment is determined to be not idle (e.g., busy). In some embodiments, performing the backoff procedure 704 includes decrementing a first backoff counter when a primary subchannel within the first frequency segment is determined to be idle, and pausing decrementing of the first backoff counter when the primary subchannel within the first frequency segment is determined to be not idle (e.g., busy).

In some embodiments, performing the backoff procedure 708 includes decrementing a second backoff counter when a subchannel within the second frequency segment is determined to be idle, and pausing decrementing of the second backoff counter when the subchannel within the second frequency segment is determined to be not idle (e.g., busy). In some embodiments, performing the backoff procedure 708 includes decrementing a second backoff counter when a primary subchannel within the second frequency segment is determined to be idle, and pausing decrementing of the second backoff counter when the primary subchannel within the second frequency segment is determined to be not idle (e.g., busy).

In the example transmission 700 of FIG. 7, the first backoff counter expires prior to the second backoff counter expiring. In response to the first backoff counter expiring prior to the second backoff counter expiring, the communication device defers transmitting (e.g., waits to transmit) in the first frequency segment until the second backoff counter expires. In response to the second backoff counter expiring, the communication transmits (e.g., the network interface 122 transmits, the PHY processor 130 transmits, the network interface 162 transmits, the PHY processor 170 transmits, etc.) a transmission 720 that includes a first transmission 724 in the first frequency segment and a second transmission 728 in the second frequency segment. The first transmission 724 and the second transmission 728 begin at a same time.

In an embodiment, the first transmission 724 comprises a first PHY data unit and the second transmission 728 comprises a PHY data unit packet. In another embodiment, the first transmission 724 and the second transmission 728 correspond to a single PHY data unit that spans the operating channel.

Figure 8:
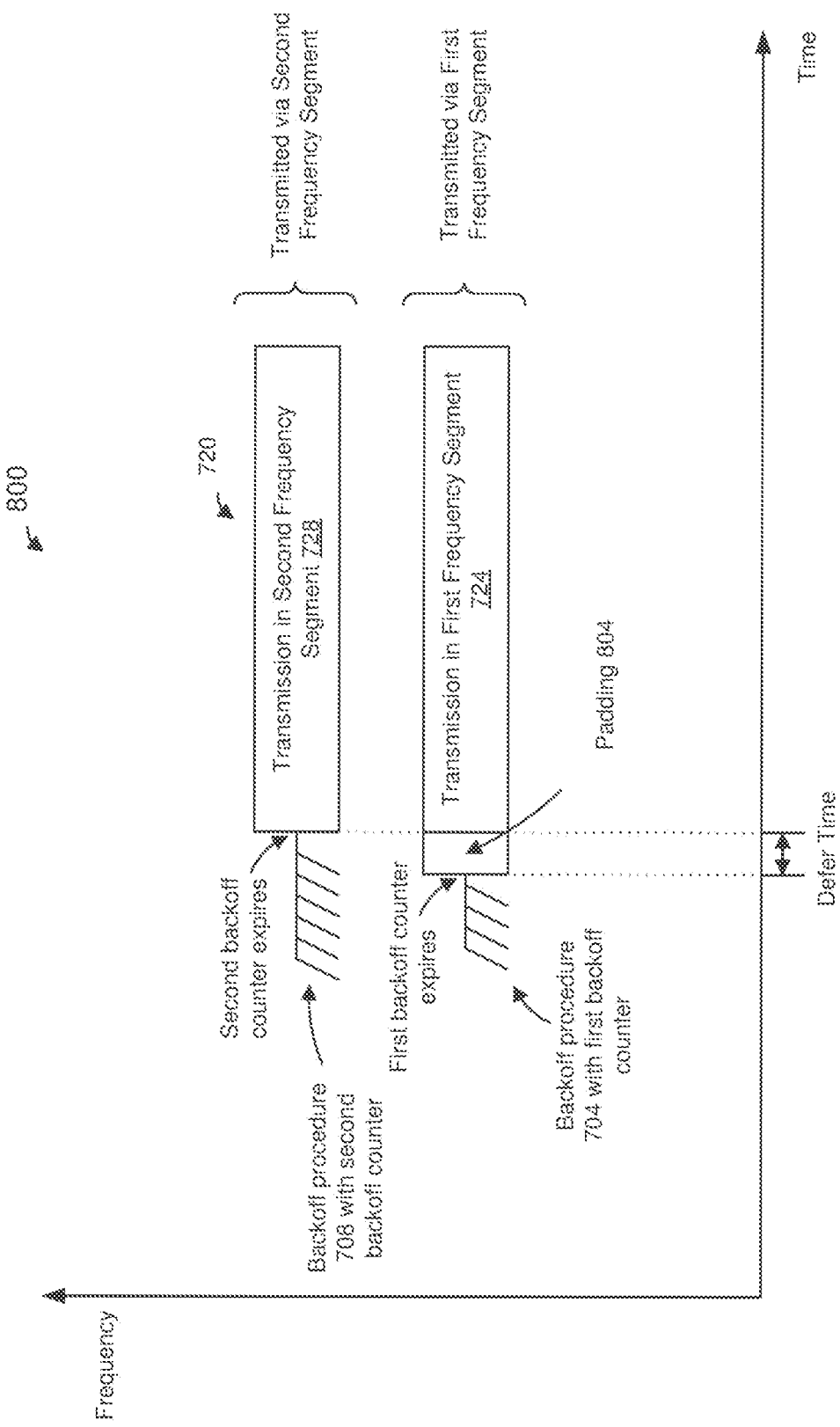
FIG. 8 is a diagram of another example of synchronized and simultaneous transmissions in multiple frequency segments, according to another embodiment.

FIG. 8 is a diagram of another illustrative example of a simultaneous transmission in multiple frequency segments beginning at a same time, according to another embodiment. The transmission 800 is performed in accordance with the method 600 of FIG. 6, in some embodiments. In other embodiments, the transmission 800 is performed in accordance with another suitable method for simultaneously transmitting in multiple frequency segments beginning at a same time.

The transmission 800 is within an operating channel that includes a first frequency segment and a second frequency segment. In some embodiments, the first frequency segment corresponds to a first communication link and the second frequency segment corresponds to a second communication link.

The transmission 800 is similar to the transmission 700 of FIG. 7, and like-numbered elements are not described in detail for purposes of brevity.

In response to the first backoff counter expiring prior to the second backoff counter expiring, the communication device defers transmitting (e.g., waits to transmit) the transmission 724 and transmits a padding signal 804 until the second backoff counter expires. In response to the second backoff counter expiring, the communication stops transmitting the padding signal 804 and begins transmitting (e.g., the network interface 122 transmits, the PHY processor 130 transmits, the network interface 162 transmits, the PHY processor 170 transmits, etc.) the transmission 720 that includes the first transmission 724 in the first frequency segment and the second transmission 728 in the second frequency segment. In an embodiment, the transmission 724 includes a PHY preamble with a training field (e.g., a legacy short training field (L-STF) or another suitable training field) that is used by receivers for packet detection, among other things. In some embodiments, the padding signal 804 has a low cross-correlation with the training field in the PHY preamble used by receivers for packet detection so that a probability of receivers mistaking the padding signal 804 for a beginning of a packet is low. Additionally or alternatively, the padding signal 804 is configured to prompt receiver devices to determine that that the subchannel(s) in which the padding signal 804 is transmitted is/are busy, which increases the probability that other communication devices will not attempt to transmit in the subchannel(s) corresponding to the first transmission 724 between when the first backoff counter expires and when the second backoff counter expires, according to some embodiments.

Although FIGS. 7 and 8 illustrate example simultaneous transmissions in two frequency segments, in other embodiments three or more transmissions are simultaneously transmitted in three or more respective frequency segments. With respect to FIG. 8, in some embodiments, padding is transmitted in two or more frequency segments.

Referring now to FIGS. 6-8, when a frame transmission fails in connection with a simultaneous transmission in multiple frequency segments (e.g., failure to receive an acknowledgment of the frame), the value of CW is adjusted (e.g., is approximately doubled with an upper bound of CWmax) for only one of the backoff counters (e.g., the value of CW for one or more other backoff counters is kept the same), according to an embodiment. When a frame transmission in one frequency segment fails in connection with a simultaneous transmission in multiple frequency segments (e.g., failure to receive an acknowledgment of the frame), the value of CW is adjusted (e.g., is approximately doubled with an upper bound of CWmax) for only the backoff counter that corresponds to the one frequency segment (e.g., the value of CW for one or more other backoff counters is kept the same), according to an embodiment. In other embodiments, when a frame transmission in one frequency segment fails in connection with a simultaneous transmission in multiple frequency segments (e.g., failure to receive an acknowledgment of the frame), the value of CW is adjusted (e.g., is approximately doubled with an upper bound of CWmax) for all of the backoff counters.

Figure 9:
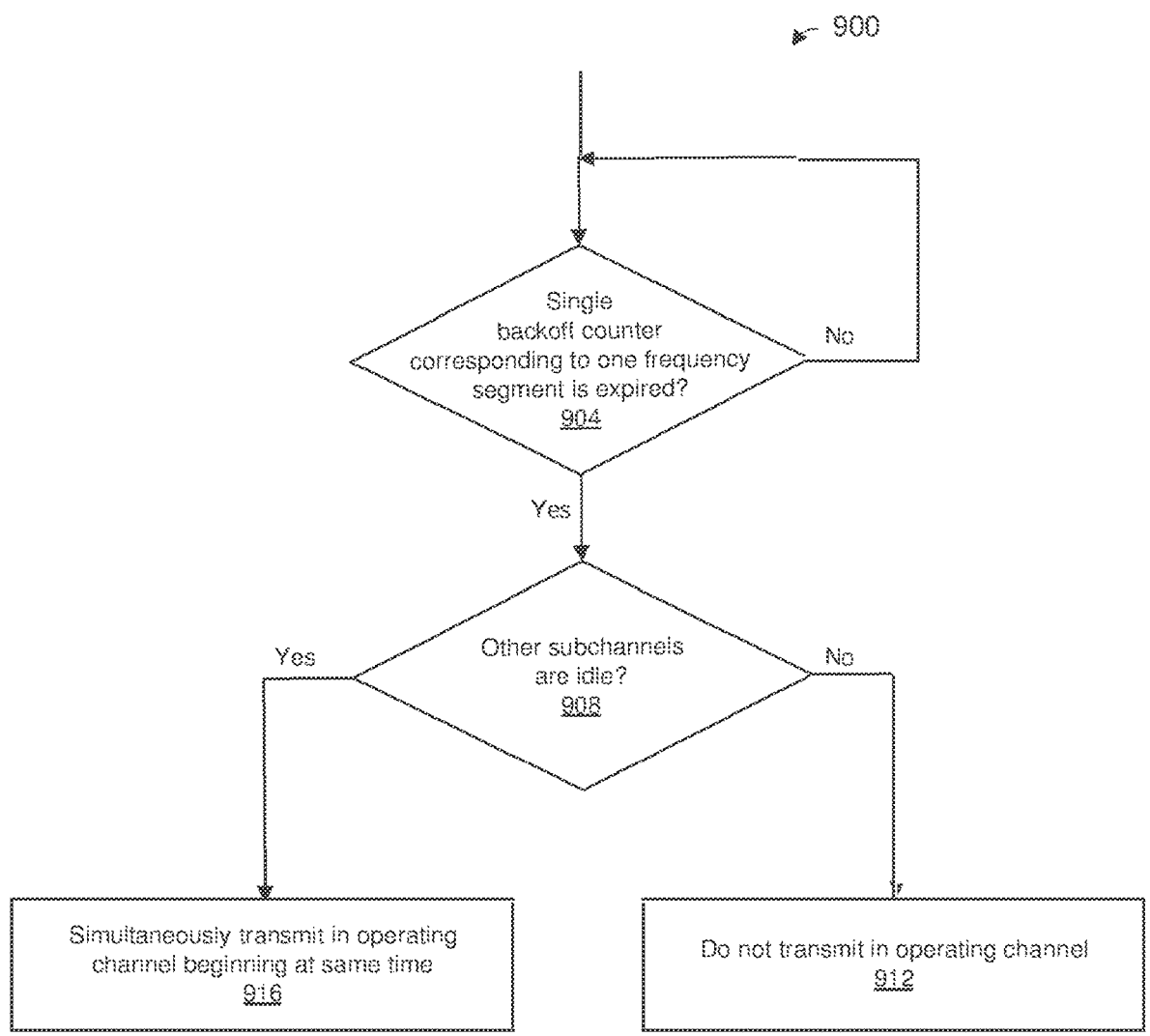
FIG. 9 is a flow diagram of another example method for simultaneously transmitting in multiple frequency segments, according to an embodiment.

FIG. 9 is a flow diagram of another example method 900 for simultaneously transmitting in multiple frequency segments beginning at a same time, according to another embodiment. In some embodiments, the multiple frequency segments correspond to respective communication links. In some embodiments, the AP 114 and/or the client station 154 are configured to implement the method 900, and FIG. 9 is described with reference to FIG. 1 merely for explanatory purposes. In other embodiments, the method 500 is implemented by another suitable communication device.

At block 904, a communication device determines (e.g., the network interface 122 determines, the MAC processor 126 determines, the backoff controller 140 determines, the network interface 162 determines, the MAC processor 166 determines, the backoff controller 190 determines, etc.) whether a single backoff counter (e.g., backoff counter 142, backoff counter 192, etc.) corresponding to a single frequency segment of an operating channel is expired (e.g., has reached zero). In an embodiment, the backoff counter 142/192 corresponds to a subchannel within the single frequency segment, and the backoff counter 142/192 is decremented when the subchannel is determined to be idle and decrementing is suspended when the subchannel is determined to be busy. In an embodiment, the backoff counter 142/192 corresponds to a primary subchannel within the single frequency segment, and the backoff counter 142/192 is decremented when the primary subchannel is determined to be idle and decrementing is suspended when the primary subchannel is determined to be busy.

In response to determining, at block 904, that the single backoff counter has not expired, the communication device waits (e.g., the network interface 122 waits, the MAC processor 126 waits, the backoff controller 140 waits, the network interface 162 waits, the MAC processor 166 waits, the backoff controller 190 waits, etc.) until the single backoff counter expires.

In response to determining, at block 904, that the single backoff counter has expired, the flow proceeds to block 908. At block 908, the communication device determines whether all of the other subchannels (e.g., subchannels other than the primary subchannel corresponding to the backoff counter) in the operating channel are idle for a determined time period prior to a beginning of transmission in the operating channel. In an embodiment, the defined time period is a suitable time duration such as PIFS as defined by the IEEE 802.11 Standard. In other embodiments, the defined time period is another suitable time duration such as a DIFS as defined by the IEEE 802.11 Standard, SIFS as defined by the IEEE 802.11 Standard, or another suitable time duration.

In response to determining, at block 908, that not all of the other subchannels in the operating channel are idle for the determined time period prior to the beginning of transmission in the operating channel (e.g., that one or more of the other subchannels are busy), the flow proceeds to block 912. At block 912, a transmission in the operating channel is not performed. In some embodiments, in connection with block 912, the single backoff counter is reset and the flow 900 is repeated. In another embodiment, a transmission in i) the primary subchannel corresponding to the backoff counters and ii) one or more other subchannels that are idle (if any) is performed.

On the other hand, in response to determining, at block 908, that all of the other subchannels in the operating channel are idle for the determined time period prior to the beginning of transmission in the operating channel (e.g., that one or more of the secondary subchannels are busy), the flow proceeds to block 916. At block 916, a transmission in the operating channel is performed, including simultaneously transmitting in multiple frequency segments beginning at a same time.

Figure 10:
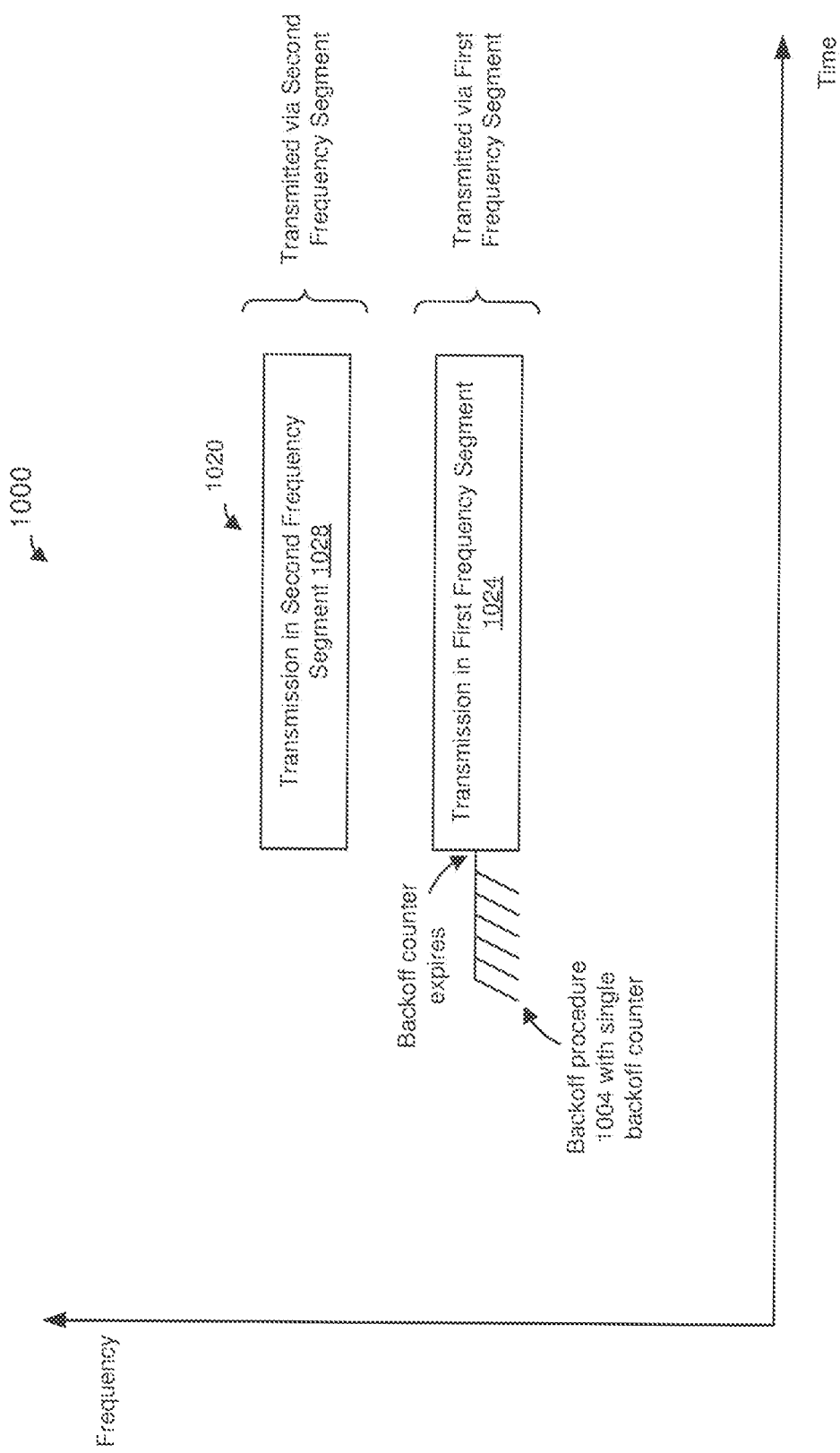
FIG. 10 is a diagram of another example of synchronized and simultaneous transmissions in multiple frequency segments, according to another embodiment.

FIG. 10 is a diagram of an illustrative example of a simultaneous transmission in multiple frequency segments beginning at a same time, according to an embodiment. The transmission 1000 is performed in accordance with the method 900 of FIG. 9, in some embodiments. In other embodiments, the transmission 1000 is performed in accordance with another suitable method for simultaneously transmitting in multiple frequency segments beginning at a same time.

The transmission 1000 is within an operating channel that includes a first frequency segment and a second frequency segment. In some embodiments, the first frequency segment corresponds to a first communication link and the second frequency segment corresponds to a second communication link.

A communication device performs (e.g., the network interface 122 performs, the MAC processor 126 performs, the backoff controller 140 performs, the network interface 162 performs, the MAC processor 166 performs, the backoff controller 190 performs, etc.) a backoff procedure 1004 in connection with a first frequency segment. In some embodiments, performing the backoff procedure 1004 includes decrementing a backoff counter when a subchannel within the first frequency segment is determined to be idle, and pausing decrementing of the backoff counter when the subchannel within the first frequency segment is determined to be not idle (e.g., busy). In some embodiments, performing the backoff procedure 1004 includes decrementing the backoff counter when a primary subchannel within the first frequency segment is determined to be idle, and pausing decrementing of the backoff counter when the primary subchannel within the first frequency segment is determined to be not idle (e.g., busy).

In response to the backoff counter expiring, the communication transmits (e.g., the network interface 122 transmits, the PHY processor 130 transmits, the network interface 162 transmits, the PHY processor 170 transmits, etc.) a transmission 1020 that includes a first transmission 1024 in the first frequency segment and a second transmission 1028 in the second frequency segment. The first transmission 1024 and the second transmission 1028 begin at a same time.

In an embodiment, the first transmission 1024 comprises a first PHY data unit and the second transmission 1028 comprises a PHY data unit packet. In another embodiment, the first transmission 1024 and the second transmission 1028 correspond to a single PHY data unit that spans the operating channel.

In some embodiments, the frequency segment in which a backoff procedure is performed for transmissions over multiple frequency segments and beginning at a same time is changed over time. For example, in some embodiments, in connection with a first transmission in multiple frequency segments, a communication device chooses a frequency segment, from among the multiple frequency segments, for performing a backoff procedure that is different than another frequency segment in which a backoff procedure was used for a previous second transmission via the multiple frequency segments.

FIG. 11 is a diagram of an illustrative example of a plurality of sets of simultaneous transmissions 1100, according to an embodiment. Each of the sets of transmissions in the plurality of sets of transmissions 1100 is performed in accordance with the method 900 of FIG. 9, in some embodiments. In other embodiments, each of the sets of transmissions in the plurality of sets of transmissions 1100 is performed in accordance with another suitable method for simultaneously transmitting in multiple frequency segments beginning at a same time.

The sets of transmissions 1100 are within an operating channel that includes a first frequency segment and a second frequency segment. In some embodiments, the first frequency segment corresponds to a first communication link and the second frequency segment corresponds to a second communication link.

In connection with a first set of transmissions 1104, a communication device performs (e.g., the network interface 122 performs, the MAC processor 126 performs, the backoff controller 140 performs, the network interface 162 performs, the MAC processor 166 performs, the backoff controller 190 performs, etc.) a backoff procedure 1108 in connection with a first frequency segment. In some embodiments, performing the backoff procedure 1108 includes decrementing a backoff counter when a subchannel within the first frequency segment is determined to be idle, and pausing decrementing of the backoff counter when the subchannel within the first frequency segment is determined to be not idle (e.g., busy). In some embodiments, performing the backoff procedure 1108 includes decrementing the backoff counter when a primary subchannel within the first frequency segment is determined to be idle, and pausing decrementing of the backoff counter when the primary subchannel within the first frequency segment is determined to be not idle (e.g., busy).

In response to the backoff counter expiring, the communication transmits (e.g., the network interface 122 transmits, the PHY processor 130 transmits, the network interface 162 transmits, the PHY processor 170 transmits, etc.) the set of transmissions 1104, which includes a first transmission 1124 in the first frequency segment and a second transmission 1128 in the second frequency segment. The first transmission 1124 and the second transmission 1128 begin at a same time.

In an embodiment, the first transmission 1124 comprises a first PHY data unit and the second transmission 1128 comprises a PHY data unit packet. In another embodiment, the first transmission 1124 and the second transmission 1128 correspond to a single PHY data unit that spans the operating channel.

In connection with a second set of transmissions 1134, the communication device performs (e.g., the network interface 122 performs, the MAC processor 126 performs, the backoff controller 140 performs, the network interface 162 performs, the MAC processor 166 performs, the backoff controller 190 performs, etc.) a backoff procedure 1138 in connection with the second frequency segment. In some embodiments, performing the backoff procedure 1138 includes decrementing a backoff counter when a subchannel within the second frequency segment is determined to be idle, and pausing decrementing of the backoff counter when the subchannel within the second frequency segment is determined to be not idle (e.g., busy). In some embodiments, performing the backoff procedure 1138 includes decrementing the backoff counter when a primary subchannel within the second frequency segment is determined to be idle, and pausing decrementing of the backoff counter when the primary subchannel within the second frequency segment is determined to be not idle (e.g., busy).

In response to the backoff counter expiring, the communication transmits (e.g., the network interface 122 transmits, the PHY processor 130 transmits, the network interface 162 transmits, the PHY processor 170 transmits, etc.) the set of transmissions 1134, which includes a first transmission 1144 in the first frequency segment and a second transmission 1148 in the second frequency segment. The first transmission 1144 and the second transmission 1148 begin at a same time.

In an embodiment, the first transmission 1144 comprises a first PHY data unit and the second transmission 1148 comprises a PHY data unit packet. In another embodiment, the first transmission 1144 and the second transmission 1148 correspond to a single PHY data unit that spans the operating channel.

In connection with a third set of transmissions 1154, the communication device performs (e.g., the network interface 122 performs, the MAC processor 126 performs, the backoff controller 140 performs, the network interface 162 performs, the MAC processor 166 performs, the backoff controller 190 performs, etc.) a backoff procedure 1158 in connection with the first frequency segment. In some embodiments, performing the backoff procedure 1158 includes decrementing a backoff counter when a subchannel within the first frequency segment is determined to be idle, and pausing decrementing of the backoff counter when the subchannel within the first frequency segment is determined to be not idle (e.g., busy). In some embodiments, performing the backoff procedure 1158 includes decrementing the backoff counter when a primary subchannel within the first frequency segment is determined to be idle, and pausing decrementing of the backoff counter when the primary subchannel within the first frequency segment is determined to be not idle (e.g., busy).

In response to the backoff counter expiring, the communication transmits (e.g., the network interface 122 transmits, the PHY processor 130 transmits, the network interface 162 transmits, the PHY processor 170 transmits, etc.) the set of transmissions 1154, which includes a first transmission 1164 in the first frequency segment and a second transmission 1168 in the second frequency segment. The first transmission 1164 and the second transmission 1168 begin at a same time.

In an embodiment, the first transmission 1164 comprises a first PHY data unit and the second transmission 1168 comprises a PHY data unit packet. In another embodiment, the first transmission 1164 and the second transmission 1168 correspond to a single PHY data unit that spans the operating channel.

Although FIGS. 10 and 11 illustrate example simultaneous transmissions in two frequency segments, in other embodiments three or more transmissions are simultaneously transmitted in three or more respective frequency segments. With respect to FIG. 11, in some embodiments, backoff operations are performed in three or more frequency segments.

FIGS. 9-11 describe performing a backoff operation in only frequency segment using only one backoff counter. In some embodiments, the communication device maintains (e.g., the network interface 122 maintains, the MAC processor 126 maintains, the backoff controller 140 maintains, the network interface 162 maintains, the MAC processor 166 maintains, the backoff controller 190 maintains, etc.) multiple backoff counters for multiple frequency segments, and backoff counters corresponding to other frequency segments are ignored at least when the one backoff counter corresponding to the one frequency segment expires. In an embodiment, when another backoff counter corresponding to another frequency segment expires, the other backoff counter is reset as discussed above. In an embodiment, when another backoff counter corresponding to another frequency segment expires, the value of CW is increased and the other backoff counter is reset as discussed above. In an embodiment, the value of CW is increased by adding a value randomly or pseudorandomly selected from the range [0, 1]. In another embodiment, when another backoff counter corresponding to another frequency segment expires, the value of CW kept the same and the other backoff counter is reset as discussed above.

Referring to FIGS. 9-11, when a frame transmission fails in connection with a simultaneous transmission in multiple frequency segments (e.g., failure to receive an acknowledgment of the frame), the value of CW is adjusted (e.g., is approximately doubled with an upper bound of CWmax) for only one of the backoff counters (e.g., the value of CW for one or more other backoff counters is kept the same), according to an embodiment. When a frame transmission in one frequency segment fails in connection with a simultaneous transmission in multiple frequency segments (e.g., failure to receive an acknowledgment of the frame), the value of CW is adjusted (e.g., is approximately doubled with an upper bound of CWmax) for only the backoff counter that corresponds to the one frequency segment (e.g., the value of CW for one or more other backoff counters is kept the same), according to an embodiment. In other embodiments, when a frame transmission in one frequency segment fails in connection with a simultaneous transmission in multiple frequency segments (e.g., failure to receive an acknowledgment of the frame), the value of CW is adjusted (e.g., is approximately doubled with an upper bound of CWmax) for all of the backoff counters.

In various embodiments discussed above, the communication device determines whether a subchannel is idle by comparing an energy level measured in the subchannel to a threshold. In some embodiments, the communication device additionally or alternatively determines (e.g., the network interface 122 determines, the MAC processor 126 determines, the backoff controller 140 determines, the network interface 162 determines, the MAC processor 166 determines, the backoff controller 190 determines, etc.) whether a subchannel is idle by determining whether a network allocation vector (NAV) counter corresponding to the subchannel is expired. In some embodiments, the NAV counter indicates whether another communication device has seized a communication medium. For example, the NAV counter is set using duration information in a received frame, and the NAV counter is decremented at a predetermined rate. When the NAV counter expires (e.g., reaches zero), this indicates that no other communication device is currently in control of the communication medium.

Embodiment 1: A method for simultaneously transmitting in multiple frequency segments, comprising: determining, at a communication device, that simultaneous transmission and reception via multiple frequency segments is not permitted; transmitting, by the communication device, a first packet in a first frequency segment beginning at a first time; transmitting, by the communication device, a second packet in a second frequency segment beginning at a second time that is different than the first time, wherein transmission of the second packet overlaps in time with transmission of the first packet; and in response to having determined that simultaneous transmission and reception via multiple frequency segments is not permitted, including in the first packet padding so that an end of transmission of the first packet occurs at a same time as an end of transmission of the second packet.

Embodiment 2: The method of embodiment 1, wherein determining that simultaneous transmission and reception via multiple frequency segments is not permitted comprises: determining that the communication device is not permitted to simultaneously transmit and receive via multiple frequency segments.

Embodiment 3: The method of embodiment 1, wherein the communication device is a first communication device, and wherein: transmitting the second packet in the second frequency segment comprises transmitting the second packet to a second communication device in the second frequency segment; and determining that simultaneous transmission and reception via multiple frequency segments is not permitted comprises: determining that the second communication device is not permitted to simultaneously transmit and receive via multiple frequency segments.

Embodiment 4: The method of embodiment 3, wherein that the second communication device is not permitted to simultaneously transmit and receive via multiple frequency segments comprises: receiving, at the first communication device, a third packet from the second communication device, the third packet including information indicating that the second communication device is not permitted to simultaneously transmit and receive via multiple frequency segments.

Embodiment 5: The method of embodiment 1, wherein determining that simultaneous transmission and reception via multiple frequency segments is not permitted comprises: determining that simultaneous transmission and reception via multiple frequency segments is not permitted in a wireless local area network (WLAN) to which the communication device belongs.

Embodiment 6: The method of embodiment 5, wherein determining that simultaneous transmission and reception via multiple frequency segments is not permitted in the WLAN comprises: receiving, at the communication device, a third packet from an access point that manages the WLAN, the third packet including information indicating that simultaneous transmission and reception via multiple frequency segments is not permitted in the WLAN.

Embodiment 7: The method of any of embodiments 1-6, further comprising: in response to determining that simultaneous transmission and reception via multiple frequency segments is not permitted, prompting a physical layer (PHY) processor of the communication device to include in the first packet the padding so that the end of transmission of the first packet occurs at the same time as the end of transmission of the second packet.

Embodiment 8: A first communication device, comprising a wireless network interface device that is configured to communicate via multiple frequency segments. The wireless network interface device includes one or more integrated circuit (IC) devices configured to: determine that simultaneous transmission and reception via multiple frequency segments is not permitted; control the wireless network interface device to transmit a first packet in a first frequency segment beginning at a first time; control the wireless network interface device to transmit a second packet in a second frequency segment beginning at a second time that is different than the first time, wherein transmission of the second packet overlaps in time with transmission of the first packet; and in response to having determined that simultaneous transmission and reception via multiple frequency segments is not permitted, include in the first packet padding so that an end of transmission of the first packet occurs at a same time as an end of transmission of the second packet.

Embodiment 9: The first communication device of embodiment 8, wherein the one or more IC devices are configured to: determine that the first communication device is not permitted to simultaneously transmit and receive via multiple frequency segments.

Embodiment 10: The first communication device of embodiment 8, wherein the one or more IC devices are configured to: control the wireless network interface device to transmit the second packet to a second communication device in the second frequency segment; and determine that simultaneous transmission and reception via multiple frequency segments is not permitted at least by determining that the second communication device is not permitted to simultaneously transmit and receive via multiple frequency segments.

Embodiment 11: The first communication device of embodiment 10, wherein the one or more IC devices are configured to: determine that the second communication device is not permitted to simultaneously transmit and receive via multiple frequency segments using information in a third packet, received from the second communication device, the information in the third packet indicating that the second communication device is not permitted to simultaneously transmit and receive via multiple frequency segments.

Embodiment 12: The first communication device of embodiment 8, wherein the one or more IC devices are configured to: determine that simultaneous transmission and reception via multiple frequency segments is not permitted at least by determining that simultaneous transmission and reception via multiple frequency segments is not permitted in a WLAN to which the communication device belongs.

Embodiment 13: The first communication device of embodiment 12, wherein the one or more IC devices are configured to: determine that simultaneous transmission and reception via multiple frequency segments is not permitted in the WLAN using information in a third packet, received from an access point that manages the WLAN, the information in the third packet indicating that simultaneous transmission and reception via multiple frequency segments is not permitted in the WLAN.

Embodiment 14: The first communication device of any of embodiments 8-13, wherein: the wireless network interface comprises a physical layer (PHY) processor implemented on the one or more IC devices; and the one or more IC devices are configured to, in response to determining that simultaneous transmission and reception via multiple frequency segments is not permitted, prompt the PHY processor to include in the first packet the padding so that the end of transmission of the first packet occurs at the same time as the end of transmission of the second packet.

Embodiment 15: A method for simultaneously transmitting in multiple frequency segments, comprising: performing, at a communication device, a backoff operation corresponding to one frequency segment among the multiple frequency segments, the backoff operation involving decrementing a backoff counter in connection with the one frequency segment; determining, at a communication device, whether the backoff counter of the communication device is expired; and in response to determining that the backoff counter has expired, simultaneously transmitting, by the communication device, respective transmissions in respective frequency segments beginning at a same time.

Embodiment 16: The method of embodiment 15, further comprising: decrementing, by the communication device, the backoff counter when a subchannel in the one frequency segment is determined to be idle; and suspending, by the communication device, the decrementing of the backoff counter when the subchannel in the one frequency segment is determined to be busy.

Embodiment 17: The method of embodiment 16, further comprising: in connection with determining that the backoff counter has expired, determining, at the communication device, whether one or more other subchannels in the multiple frequency segments are idle for a predetermined time period prior to a beginning of the respective transmissions in respective frequency segments; wherein simultaneously transmitting the respective transmissions in the respective frequency segments beginning at the same time is further in response to determining that the one or more other subchannels in the multiple frequency segments are idle for the predetermined time period.

Embodiment 18: The method of embodiment 17, further comprising: in response to determining that one or more other subchannels in the multiple frequency segments are busy during the predetermined time period, determining to postpone the simultaneous transmission of the respective transmissions in the respective frequency segments.

Embodiment 19: The method of any of embodiments 15-18, wherein, in connection with a subsequent simultaneous transmission in multiple frequency segments: selecting, at the communication device, another frequency segment different than the one frequency segment; performing, at the communication device, another backoff operation corresponding to the other frequency segment different than the one frequency segment, the other backoff operation including decrementing the backoff counter or another backoff counter in connection with the other frequency segment; determining, at a communication device, whether the backoff counter or the other backoff counter is expired; and in response to determining that the backoff counter or the other backoff counter has expired, performing, by the communication device, the subsequent simultaneous transmission in the multiple frequency segments.

Embodiment 20: The method of any of embodiments 15-18 combined with the method of any of embodiments 1-7.

Embodiment 21: A communication device, comprising: a wireless network interface device that is configured to communicate via multiple frequency segments, the wireless network interface device including one or more IC devices and a backoff counter implemented on the one or more IC devices. The one or more IC devices are configured to: perform a backoff operation corresponding to one frequency segment among the multiple frequency segments, the backoff operation involving decrementing the backoff counter in connection with the one frequency segment; determine whether the backoff counter is expired; and in response to determining that the backoff counter has expired, control the wireless network interface device to simultaneously transmit respective transmissions in respective frequency segments beginning at a same time.

Embodiment 22: The communication device of embodiment 21, wherein the one or more IC devices are further configured to: decrement the backoff counter when a subchannel in the one frequency segment is determined to be idle; and suspend the decrementing of the backoff counter when the subchannel in the one frequency segment is determined to be busy.

Embodiment 23: The communication device of embodiment 22, wherein the one or more IC devices are further configured to: in connection with determining that the backoff counter has expired, determine whether one or more other subchannels in the multiple frequency segments are idle for a predetermined time period prior to a beginning of the respective transmissions in respective frequency segments; and control the wireless network interface device to simultaneously transmit the respective transmissions in the respective frequency segments further in response to determining that the one or more other subchannels in the multiple frequency segments are idle for the predetermined time period.

Embodiment 24: The communication device of embodiment 23, wherein the one or more IC devices are further configured to: in response to determining that one or more other subchannels in the multiple frequency segments are busy during the predetermined time period, determine to postpone the simultaneous transmission of the respective transmissions in the respective frequency segments.

Embodiment 25: The communication device of any of embodiments 21-24, wherein the one or more IC devices are further configured to, in connection with a subsequent simultaneous transmission in multiple frequency segments: select another frequency segment different than the one frequency segment; perform another backoff operation corresponding to the other frequency segment different than the one frequency segment, the other backoff operation including decrementing the backoff counter or another backoff counter in connection with the other frequency segment; determine whether the backoff counter or the other backoff counter is expired; and in response to determining that the backoff counter or the other backoff counter has expired, control the wireless network interface device to perform the subsequent simultaneous transmission in the multiple frequency segments.

Embodiment 26: The communication device of any of embodiments 21-25 wherein the one or more IC devices are further configured to perform the acts recited in any of embodiments 8-14.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN), comprising:
   determining, at a communication device, that the communication device is to transmit in a first frequency segment simultaneously with transmitting in a second frequency segment;
   performing, at the communication device, a first backoff operation with a first backoff counter to determine when to transmit a first packet in the first frequency segment, the first backoff counter measuring a first contention window;
   performing, at the communication device, a second backoff operation with a second backoff counter to determine when to transmit a second packet in the second frequency segment, the second backoff counter measuring a second contention window;
   in connection with the first backoff counter expiring, transmitting, by the communication device, the first packet in the first frequency segment;
   in connection with the second backoff counter expiring, transmitting, by the communication device, the second packet in the second frequency segment simultaneously with transmitting the first packet in the first frequency segment; and
   in response to determining, at the communication device, that transmission of the first packet in the first frequency segment failed:
      increasing, by the communication device, the first contention window for a retransmission of the first packet in the first frequency segment, and
      not adjusting, by the communication device, the second contention window for a next transmission in the second frequency segment.

2. The method for communicating of claim 1, wherein increasing the first contention window for the retransmission of the first packet in the first frequency segment comprises doubling the first contention window.

3. The method for communicating of claim 1, wherein:
   performing the first backoff operation comprises:
      decrementing, by the communication device, the first backoff counter when a first subchannel in the first frequency segment is determined to be idle, and
      suspending, by the communication device, the decrementing of the first backoff counter when the first subchannel in the first frequency segment is determined to be busy; and
   performing the second backoff operation comprises:
      decrementing, by the communication device, the second backoff counter when a second subchannel in the second frequency segment is determined to be idle, and
      suspending, by the communication device, the decrementing of the second backoff counter when the second subchannel in the second frequency segment is determined to be busy.

4. The method for communicating of claim 1, further comprising:
   in connection with determining that the first backoff counter has expired, determining, at the communication device, whether one or more other subchannels in the first frequency segment are idle for a predetermined time period prior to a beginning of the transmission of the first packet in the first frequency segment; and
   in connection with determining that the second backoff counter has expired, determining, at the communication device, whether one or more other subchannels in the second frequency segment are idle for the predetermined time period prior to a beginning of the transmission of the second packet in the second frequency segment;
   wherein transmitting the first packet in the first frequency segment is responsive to determining that the one or more other subchannels in the first frequency segment are idle for the predetermined time period; and
   wherein transmitting the second packet in the second frequency segment is responsive to determining that the one or more other subchannels in the second frequency segment are idle for the predetermined time period.

5. The method for communicating of claim 1, wherein:
   determining that the communication device is to transmit in the first frequency segment simultaneously with transmitting in the second frequency segment comprises determining that the communication device is to transmit in the first frequency segment while the communication device also transmits in the second frequency segment; and
   transmitting the second packet in the second frequency segment simultaneously with transmitting the first packet in the first frequency segment comprises transmitting the second packet in the second frequency segment while the communication device transmits the first packet in the first frequency segment.

6. The method for communicating of claim 5, wherein:
   transmitting the first packet includes beginning transmission of the first packet at a first time; and
   transmitting the second packet includes beginning transmission of the second packet at a second time different from the first time.

7. The method for communicating of claim 1, further comprising:
   determining, at the communication device, that the communication device is to synchronize a beginning of a first transmission in the first frequency segment with a beginning of a second transmission in the second frequency segment;
   wherein transmitting the second packet in the second frequency segment simultaneously with transmitting the first packet in the first frequency segment comprises synchronizing a beginning of a transmission of the second packet in the second frequency segment with a beginning of a transmission of the first packet in the first frequency segment.

8. The method for communicating of claim 1, wherein transmitting the first packet in the first frequency segment comprises:
   waiting, by the communication device, for the second backoff counter to expire before transmitting the first packet in the first frequency segment.

9. The method for communicating of claim 1, further comprising:
   determining, at the communication device, that the communication device is to synchronize an end of a first transmission in the first frequency segment with an end of a second transmission in the second frequency segment;
   wherein transmitting the second packet in the second frequency segment simultaneously with transmitting the first packet in the first frequency segment comprises synchronizing an end of a transmission of the second packet in the second frequency segment with an end of a transmission of the first packet in the first frequency segment.

10. The method for communicating of claim 9, wherein synchronizing the end of the transmission of the second packet in the second frequency segment with the end of the transmission of the first packet in the first frequency segment comprises adding padding to the second packet so that the end of the transmission of the second packet in the second frequency segment corresponds with the end of the transmission of the first packet in the first frequency segment.

11. A communication device, comprising:
a wireless network interface device that is configured to communicate via multiple frequency segments, the wireless network interface device including one or more integrated circuit (IC) devices and a plurality backoff counters implemented on the one or more IC devices, wherein the one or more IC devices are configured to:
determine that the communication device is to transmit in a first frequency segment simultaneously with transmitting in a second frequency segment,
perform a first backoff operation with a first backoff counter among the plurality of backoff counters to determine when to transmit a first packet in the first frequency segment, the first backoff counter measuring a first contention window,
perform a second backoff operation with a second backoff counter among the plurality of backoff counters to determine when to transmit a second packet in the second frequency segment, the second backoff counter measuring a second contention window,
in connection with the first backoff counter expiring, control the wireless network interface device to transmit the first packet in the first frequency segment,
in connection with the second backoff counter expiring, control the wireless network interface device to transmit the second packet in the second frequency segment simultaneously with transmitting the first packet in the first frequency segment, and
in response to determining that transmission of the first packet in the first frequency segment failed:
increase the first contention window for a retransmission of the first packet in the first frequency segment, and
not adjust the second contention window for a next transmission in the second frequency segment.

12. The communication device of claim 11, wherein the one or more IC devices are configured to increase the first contention window for the retransmission of the first packet in the first frequency segment by doubling the first contention window.

13. The communication device of claim 11, wherein the one or more IC devices are further configured to:
as part of performing the first backoff operation:
decrement the first backoff counter when a first subchannel in the first frequency segment is determined to be idle, and
suspend the decrementing of the first backoff counter when the first subchannel in the first frequency segment is determined to be busy; and
as part of performing the second backoff operation:
decrement the second backoff counter when a second subchannel in the second frequency segment is determined to be idle, and
suspend the decrementing of the second backoff counter when the second subchannel in the second frequency segment is determined to be busy.

14. The communication device of claim 11, wherein the one or more IC devices are further configured to:
in connection with determining that the first backoff counter has expired, determine whether one or more other subchannels in the first frequency segment are idle for a predetermined time period prior to a beginning of the transmission of the first packet in the first frequency segment; and
in connection with determining that the second backoff counter has expired, determine whether one or more other subchannels in the second frequency segment are idle for the predetermined time period prior to a beginning of the transmission of the second packet in the second frequency segment;
control the wireless network interface device to transmit the first packet in the first frequency segment in response to determining that the one or more other subchannels in the first frequency segment are idle for the predetermined time period; and
control the wireless network interface device to transmit the second packet in the second frequency segment in response to determining that the one or more other subchannels in the second frequency segment are idle for the predetermined time period.

15. The communication device of claim 11, wherein the one or more IC devices are further configured to:
as part of determining that the communication device is to transmit in the first frequency segment simultaneously with transmitting in the second frequency segment, determine that the communication device is to transmit in the first frequency segment while the communication device also transmits in the second frequency segment; and
as part of controlling the wireless network interface device to transmit the second packet in the second frequency segment simultaneously with transmitting the first packet in the first frequency segment, control the wireless network interface device to transmit the second packet in the second frequency segment while the communication device transmits the first packet in the first frequency segment.

16. The communication device of claim 15, wherein the one or more IC devices are further configured to:
control the wireless network interface device to begin transmission of the first packet at a first time; and
control the wireless network interface device to begin transmission of the second packet at a second time different from the first time.

17. The communication device of claim 11, wherein the one or more IC devices are further configured to:
determine that the communication device is to synchronize a beginning of a first transmission in the first frequency segment with a beginning of a second transmission in the second frequency segment; and
as part of controlling the wireless network interface device to transmit the second packet in the second frequency segment simultaneously with transmitting the first packet in the first frequency segment, synchronize a beginning of a transmission of the second packet in the second frequency segment with a beginning of a transmission of the first packet in the first frequency segment.

18. The communication device of claim 11, wherein the one or more IC devices are further configured to:
control the wireless network interface device to wait for the second backoff counter to expire before transmitting the first packet in the first frequency segment.

19. The communication device of claim 11, wherein the one or more IC devices are further configured to:
   determine that the communication device is to synchronize an end of a first transmission in the first frequency segment with an end of a second transmission in the second frequency segment;
   as part of controlling the wireless network interface device to transmit the second packet in the second frequency segment simultaneously with transmitting the first packet in the first frequency segment, synchronize an end of a transmission of the second packet in the second frequency segment with an end of a transmission of the first packet in the first frequency segment.

20. The communication device of claim 19, wherein the one or more IC devices are further configured to, as part of synchronizing the end of the transmission of the second packet in the second frequency segment with the end of the transmission of the first packet in the first frequency segment, add padding to the second packet so that the end of the transmission of the second packet in the second frequency segment corresponds with the end of the transmission of the first packet in the first frequency segment.

21. The communication device of claim 11, wherein the wireless network interface device comprises a plurality of transceivers configured to transmit and receiver via respective frequency segments, including:
   a first transceiver configured to transmit and receive via the first frequency segment; and
   a second transceiver configured to transmit and receive via the second frequency segment.

22. The communication device of claim 21, further comprising:
   one or more antennas coupled to the plurality of transceivers.

23. The communication device of claim 11, further comprising:
   a host processor coupled to the wireless network interface device.

24. The communication device of claim 23, further comprising:
   one or more antennas coupled to the wireless network interface device.

* * * * *